United States Patent
Kawamura et al.

(10) Patent No.: US 7,449,223 B2
(45) Date of Patent: Nov. 11, 2008

(54) POLYMERIZABLE LIQUID CRYSTAL COMPOSITION AND OPTICALLY ANISOTROPIC MEDIUM

(75) Inventors: Jyoji Kawamura, Innba-gun (JP); Yoshiyuki Ono, Yachimata (JP); Yasuyuki Suzuki, Kamagaya (JP); Hitoshi Hayakawa, Yachiyo (JP); Isa Nishiyama, Sakura (JP); Yasuyuki Watanabe, Chiba (JP); Yasuhiro Kuwana, Chiba (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 206 days.

(21) Appl. No.: 11/569,720

(22) PCT Filed: May 26, 2005

(86) PCT No.: PCT/JP2005/009638

§ 371 (c)(1),
(2), (4) Date: Nov. 28, 2006

(87) PCT Pub. No.: WO2005/116165

PCT Pub. Date: Dec. 8, 2005

(65) Prior Publication Data

US 2007/0170394 A1 Jul. 26, 2007

(30) Foreign Application Priority Data

May 31, 2004 (JP) .............................. 2004-161230

(51) Int. Cl.
*C09K 19/38* (2006.01)
*C09K 19/52* (2006.01)
*C08F 220/18* (2006.01)
*C08F 220/24* (2006.01)
*G02B 5/30* (2006.01)
*G02F 1/13363* (2006.01)

(52) U.S. Cl. .................... 428/1.3; 428/1.2; 252/299.01; 252/299.61; 252/299.66; 252/299.67; 349/117; 349/123; 524/390; 524/820; 524/833

(58) Field of Classification Search .................. 428/1.1, 428/1.2, 1.3; 252/299.01, 299.61, 299.66, 252/299.67; 349/117, 123; 524/390, 820, 524/833
See application file for complete search history.

(56) References Cited

U.S. PATENT DOCUMENTS 5,863,457 A 1/1999 Hasebe et al.
5,995,184 A 11/1999 Chung et al.
6,485,798 B1 11/2002 Aminaka et al.
2003/0085377 A1 5/2003 Dunn et al.

FOREIGN PATENT DOCUMENTS

| JP | 8-3111 A | 1/1996 |
|---|---|---|
| JP | 11-148080 A | 6/1999 |
| JP | 2000-105315 A | 4/2000 |
| JP | 2000-119222 A | 4/2000 |
| JP | 2000-178233 A | 6/2000 |
| JP | 2000-327632 A | 11/2000 |
| JP | 2000-345164 A | 12/2000 |
| JP | 2002-220421 A | 8/2002 |
| JP | 2003-012762 A | 1/2003 |
| JP | 2003-055661 A | 2/2003 |
| JP | 2003-105030 A | 4/2003 |
| JP | 2003-227935 A | 8/2003 |

OTHER PUBLICATIONS

English translation for JP 2003-227935 by computer, http://www4.ipdl.inpit.go.jp/Tokujitu/PAJdetail.ipdl?N0000=60& N0120=01 &N2001=2&N3001=2003-227935.*
International Search Report for PCT/JP2005/009638 mailed Sep. 6, 2005.

* cited by examiner

*Primary Examiner*—Shean C Wu
(74) *Attorney, Agent, or Firm*—Darby & Darby P.C.

(57) ABSTRACT

A polymerizable liquid crystal composition includes a liquid crystal compound having a polymerizable group, wherein the composition includes from 0.1 to 6.0% by weight of a (meth) acrylic copolymer (H), which 1) has a side chain containing a fluorine group, and a side chain containing a group represented by a general formula (h):

$$-\!\!\left\langle A \right\rangle\!\!-\!Y_1\!-\!\!\left\langle B \right\rangle\!\!\left(\!-\!Y_2\!-\!\!\left\langle C \right\rangle\!\right)_{\!n}\!\!-\!Y_3 \quad (h)$$

2) has a fluorine group content of 3 to 30% by weight,
3) has a ratio of side chains containing the group represented by the general formula (h) relative to the combined total of all side chains that falls within a range from 9 to 95 mol %, and
4) has a weight average molecular weight within a range from 10,000 to 300,000.

15 Claims, 2 Drawing Sheets

POLYMERIZABLE LIQUID CRYSTAL COMPOSITION AND OPTICALLY ANISOTROPIC MEDIUM

CROSS-REFERENCE TO PRIOR APPLICATION

This is a U.S. National Phase Application under 35 U.S.C. 371 of International Patent Application No. PCT/JP2005/009638 filed May 26, 2005, and claims the benefit of Japanese Patent Application No. 2004-161230, filed May 31, 2004, both of which are incorporated by reference herein. The International Application was published in Japanese on Dec. 8, 2005 as WO 2005/116165 A1 under PCT Article 21(2).

TECHNICAL FIELD

The present invention relates to a polymerizable liquid crystal composition containing an additive that improves the level of defects in the vicinity of the air interface for an optically anisotropic medium that exhibits either tilted alignment or horizontal alignment and is prepared by applying a polymerizable liquid crystal composition to a substrate, and also relates to an optically anisotropic medium produced using the polymerizable liquid crystal composition as a raw material.

BACKGROUND ART

Liquid crystal display devices (LCD) typically include liquid crystal cells, with two polarizing plates positioned on either side of the cells. In a reflective liquid crystal display device, a reflecting plate, a liquid crystal cell, and a single polarizing plate are laminated together. In these liquid crystal display devices, in order to increase the viewing angle, eliminate coloring, or adjust the phase difference in accordance with the display mode, an optical compensation sheet (a retardation plate) formed from a type of optically anisotropic medium is often positioned between the liquid crystal cell and the polarizing plate.

Typically, a polymer film with birefringence is used in the optical compensation sheet, and for example, a polymer film with birefringence, formed from an optically anisotropic medium that is produced by subjecting a polymerizable liquid crystal material to alignment treatment and subsequently curing the material with ultraviolet radiation to fix the alignment state, is currently in use as an LCD optical compensation sheet.

Furthermore, recent years have seen much progress in the development of liquid crystal device production methods such as Roll to Roll methods, which have introduced a coating process with the aim of dramatically improving the production efficiency compared with conventional batch production methods. The optical compensation sheet for a Roll to Roll application is prepared using a coating method, and is designed with the premise that another member will be laminated on the produced sheet.

In those cases where an optically anisotropic medium is prepared using a polymerizable liquid crystal material, the polymerizable liquid crystal material is usually sandwiched between two alignment films, and the alignment restraining forces from both sides are then used to align the liquid crystal molecules. However, in those cases where a coating process such as a Roll to Roll process is used in the production of an optical compensation sheet, or in cases where the process is shortened, the polymerizable liquid crystal material is applied to the surface of a substrate that exhibits an alignment function, and the alignment of the polymerizable liquid crystal material is then conducted using only the alignment restraining force from the alignment film on one side of the material. In other words, unlike the former case, the alignment restraining force tends to act more weakly on the liquid crystal molecules in the vicinity of the interface between the material and the air, which is not in contact with an alignment film. Accordingly, defects are generated at the air-liquid interface, and the quality or yield of the obtained optically anisotropic medium tends to decrease.

In order to resolve this problem, additives have been proposed that are mixed with the polymerizable liquid crystal material and control the alignment of the liquid crystal molecules in the vicinity of the air interface, and known examples of these additives include liquid crystal alignment promoting agents formed from compounds that include, within each molecule, a hydrophobic group such as a fluorine-substituted aliphatic group or an oligosiloxane group, and a group that contains at least two ring structures and exhibits an excluded volume effect (for example, see patent reference 1).

Because the hydrophobic groups of the above compounds exhibit poor co-solubility with the liquid crystal molecules, they tend to be mostly distributed along the interface with the air. In contrast, the groups within the compounds that exhibit an excluded volume effect are soluble with the liquid crystal molecules, and consequently become embedded within the liquid crystal layer. By adopting a combination of a hydrophobic group and a group that exhibits an excluded volume effect, the tilt angle of the liquid crystal molecules at the air interface can be controlled arbitrarily, regardless of the nature of the liquid crystal molecules.

As a result, an optically anisotropic medium with superior alignment can be obtained.

However, with the compounds described above, alignment problems at the air-liquid interface have been unable to be completely suppressed. Furthermore, because the above compounds are low molecular weight compounds, it is impossible to ensure that all the molecules are distributed along the air interface, and a portion of the molecules remains within the bulk of the liquid crystal layer, which can cause a reduction in the phase transition point of the liquid crystal material, and increases the danger of a reduction in the stability of the produced optically anisotropic medium and a decrease in retardation.

Furthermore, examples of known optically anisotropic media produced by curing a mixture of a polymerizable liquid crystal material and a polymer compound include a homeotropically aligned liquid crystalline composition containing a side-chain liquid crystal polymer having alkyl groups of 1 to 22 carbon atoms or fluoroalkyl groups of 1 to 22 carbon atoms and a photopolymerizable liquid crystal compound, which is capable of forming a homeotropically aligned liquid crystal layer on top of a substrate provided with no vertical alignment film, as well as a homeotropically aligned liquid crystal film produced by light irradiation of the aligned state (for example, see patent reference 2).

The above side-chain liquid crystal polymer exhibits homeotropic alignment, and by mixing in at least 10% of this polymer, a homeotropically aligned liquid crystal film with excellent durability is obtained. However in this method, an optically anisotropic medium with a tilted alignment or horizontal alignment cannot be produced. Furthermore, in the above publication, only polymers having alkyl groups of 1 to 22 carbon atoms are disclosed specifically as the side-chain liquid crystal polymer, and no specific disclosure is made of side-chain liquid crystal polymers having fluoroalkyl groups of 1 to 22 carbon atoms. Accordingly, absolutely no suggestions are made as to what types of properties or effects side-chain liquid crystal polymers having fluoroalkyl groups may possess.

Furthermore, in another known method of forming a thin film, a surfactant material that reduces the intrinsic tilted alignment of the director of the liquid crystal material at the air interface is added to the polymerizable liquid crystal material, thereby causing the alignment of the liquid crystal material at the air interface of the liquid crystal alignment layer to adopt an essentially parallel or essentially tilted configuration (for example, see patent reference 3). Specific examples of preferred surfactant materials include polyacrylate esters, polysilicon, reactive polysilicon, organosilanes, waxes, and release agents, and by using a polycyclohexyl methacrylate or a polymethyl methacrylate, the tilt angle through the thickness direction can be altered. However, the surfactant materials disclosed in this publication are unable to completely resolve the problem of defects in the vicinity of the surface.

[Patent Reference 1]
Japanese Unexamined Patent Application, First Publication No. 2000-345164
[Patent Reference 2]
Japanese Unexamined Patent Application, First Publication No. 2003-227935
[Patent Reference 3]
Japanese Unexamined Patent Application, First Publication No. 2000-105315

DISCLOSURE OF INVENTION

An object of the present invention is to provide an optically anisotropic medium with no defects in the vicinity of the air interface, and to provide a polymerizable liquid crystal composition that can be used to prepare such an optically anisotropic medium.

The inventors of the present invention discovered that a (meth)acrylic copolymer containing specific proportions of a side chain with a fluorine group that exhibits a strong tendency to exist at the air interface, and a group that is soluble with liquid crystal molecules, exhibits a powerful ability to resolve defects in the vicinity of the air interface, and that by adding a specific quantity of this copolymer, an optically anisotropic medium with no defects in the vicinity of the air interface could be obtained.

High molecular weight polymers such as (meth)acrylic copolymers exhibit poorer solubility in liquid crystals than low molecular weight compounds, and consequently undergo ready phase separation from the liquid crystal layer. In the present invention, in order to further enhance this phase separation effect, a group containing a fluorine group such as a fluorinated alkyl group is appended to the (meth)acrylic copolymer. Because this copolymer exhibits a strong tendency to undergo phase separation, and has a powerful tendency to concentrate at the air interface, a significant effect can be achieved by the addition of a very small quantity of the copolymer, and the copolymer spreads out across the surface of the polymerizable liquid crystal layer in a similar manner to an oil film floating on water, thereby enabling an optically anisotropic medium with no defects in the vicinity of the air interface to be obtained. Because only a small quantity of the copolymer is added, none of the inherent optical effects of the optically anisotropic medium formed by the polymerizable liquid crystal are lost.

Furthermore, by appending a group represented by a general formula (h) (hereafter referred to as the group (h)) to the copolymer, the concentration of the group (h) in the vicinity of the air interface can be increased. Because the group (h) is in a polymer form, movement of the group within the layer is constrained, but the group also undergoes interaction with liquid crystal compounds having a polymerizable group. As a result, the continuity between the liquid crystal compound and the group (h) improves in the vicinity of the air interface, meaning disclination, namely defects, are less likely to occur, and enabling an optically anisotropic medium to be obtained in which the alignment restraining force imparted at the substrate side of the layer is transmitted faithfully through to the vicinity of the interface.

In other words, the present invention provides a polymerizable liquid crystal composition containing a liquid crystal compound having a polymerizable group, wherein the composition includes from 0.1 to 6.0% by weight of a (meth) acrylic copolymer (H), which 1) has a side chain containing a fluorine group, and a side chain containing a group represented by a general formula (h):

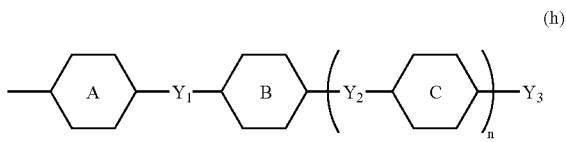

(wherein, the 6-membered rings A, B, and C each represent, independently:

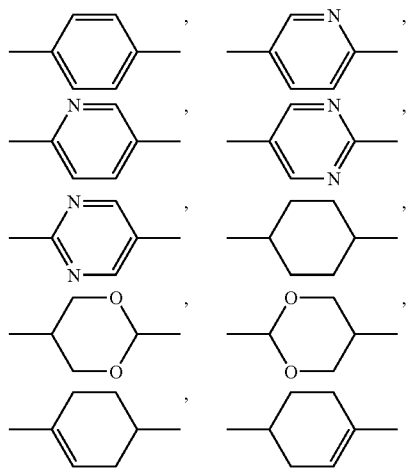

(and the 6-membered rings A, B, and C may include a fluorine atom or a methyl group), n represents an integer of either 0 or 1, $Y_1$ and $Y_2$ each represent, independently, a single bond, —$CH_2CH_2$—, —$CH_2O$—, —$OCH_2$—, —COO—, —OCO—, —C≡C—, —CH=CH—, —CF=CF—, —(CH$_2$)$_4$—, —$CH_2CH_2CH_2O$—, —$OCH_2CH_2CH_2$—, —$CH_2$=CHCH$_2$CH$_2$—, or —$CH_2CH_2$CH=CH—, and $Y_3$ represents a hydrogen atom, a halogen atom, a cyano group, or an alkyl group, alkoxy group, alkenyl group or alkenyloxy group of 1 to 20 carbon atoms), 2) has a fluorine group content of 3 to 30% by weight,
3) has a ratio of the side chains containing the group represented by the general formula (h) relative to the combined total of all side chains within a range from 9 to 95 mol%, and
4) has a weight average molecular weight within a range from 10,000 to 300,000.

Furthermore, the present invention also provides an optically anisotropic medium obtained by applying the polymerizable liquid crystal composition described above to a substrate that exhibits an alignment function, and then conducting polymerization with the composition in an aligned state.

Furthermore, the present invention also provides a retardation film obtained by applying the polymerizable liquid crystal composition described above to a substrate that exhibits an approximately horizontal alignment function in which regions with differing alignment directions are dispersed in a pattern, and then conducting polymerization with the composition in an aligned state.

By using a liquid crystal composition of the present invention, an optically anisotropic medium can be obtained that has an improved level of defects in the vicinity of the air interface.

Figure 1:
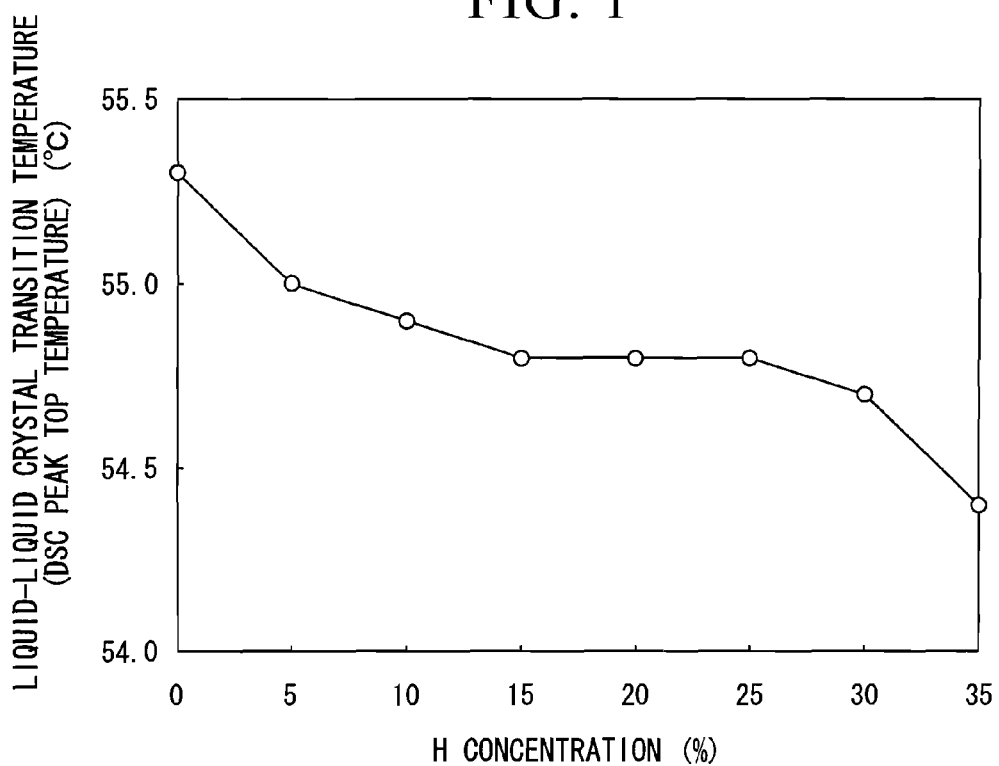
FIG. 1 is a diagram showing the relationship between the quantity of the (meth)acrylic copolymer (H) added to the polymerizable liquid crystal composition, and the liquid-liquid crystal transition temperature (in the diagram, "H concentration (%)" is the quantity added of the acrylic copolymer (H), expressed as a %).

BEST MODE FOR CARRYING OUT THE INVENTION ((Meth)acrylic Copolymer (H)—Side Chain containing a Fluorine Group)

In a (meth)acrylic copolymer (H) used in the present invention (hereafter abbreviated as the acrylic copolymer H), a side chain containing a fluorine group refers to a side chain that contains a fluoroalkyl group of 1 to 18 carbon atoms in which at least one hydrogen atom of the alkyl group has been substituted with a fluorine atom (although methylene groups within the group may, in some cases, be substituted, mutually independently, with a —$SO_2NZ_2$— or —$CONZ_2$- group, wherein $Z_2$ represents an alkyl group, and moreover, the fluoroalkyl group may also include other substituent groups such as a hydroxyl group or the like). The number of fluorine atoms within the fluoroalkyl group is preferably within a range from 5 to 35, and even more preferably from 13 to 25. Specifically, fluoroalkyl groups such as those represented by —$(CH_2)_p$— ($C_qH_sF_{2q-s+1}$), —$(CH_2)_p$—NG-$SO_2$—$(CF_2)_q$—$CF_3$, and —$(CH_2)_p$—NG-CO—$(CF_2)_q$—$CF_3$ (wherein, p and q each represent, independently, an integer from 1 to 17 (provided p+q is at least 2 but no greater than 17), s represents an integer from 0 to 9, G represents an alkyl group of 1 to 8 carbon atoms or a hydrogen atom, and each of the hydrogen atoms bonded to the various methylene groups may be substituted with a hydroxyl group) are preferred. Of these, groups in which p is from 1 to 4 and q is from 2 to 16 are preferred, and groups in which p is from 2 to 3 and q is from 5 to 16 are particularly desirable. The value of q is most preferably within a range from 6 to 11.

This fluorine-containing side chain is bonded to the main chain of the acrylic copolymer via an ester linkage or the like.

((Meth)acrylic Copolymer (H)—Group (h))

In an acrylic copolymer H used in the present invention, a side chain containing a group represented by the general formula (h) is bonded to the main chain of the acrylic copolymer via an ester linkage or the like. The group (h) either exhibits alignment properties in a stand-alone state, or has a property wherein the group develops alignment properties through a synergistic effect with another group.

In the group (h), the 6-membered rings A, B, and C may contain a fluorine atom or methyl group. Of the various possibilities, a 1,4-phenylene group and 1,4-cyclohexylene group are preferred.

In the group (h), $Y_1$ and $Y_2$ preferably each represent, independently, a single bond, —$CH_2CH_2$—, —COO—, —OCO—, or —C≡C— group.

Of the various possibilities, $Y_3$ is preferably a hydrogen atom, a fluorine atom, a cyano group, or an alkyl group, alkoxy group, alkenyl group or alkenyloxy group of 1 to 20 carbon atoms. In those cases where an optically anisotropic medium with a large optical anisotropy when viewed from a direction perpendicular to the substrate surface is desired, a hydrogen atom is preferably selected as the $Y_3$ group, whereas when an optically anisotropic medium with a small optical anisotropy is desired, an alkyl group, alkoxy group, alkenyl group or alkenyloxy group is preferably selected as the $Y_3$ group.

Specific examples of the group (h) include the structures shown below.

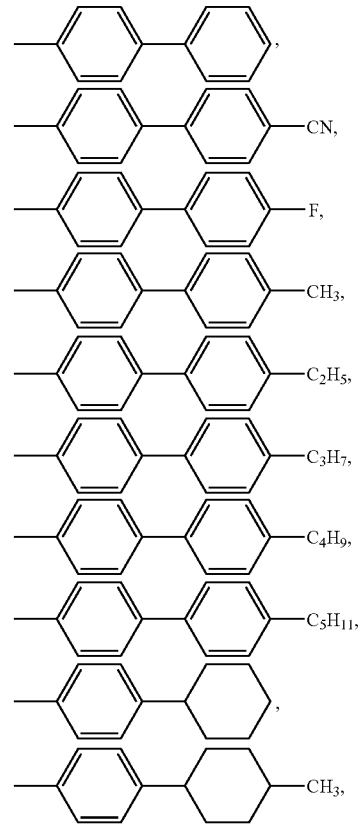

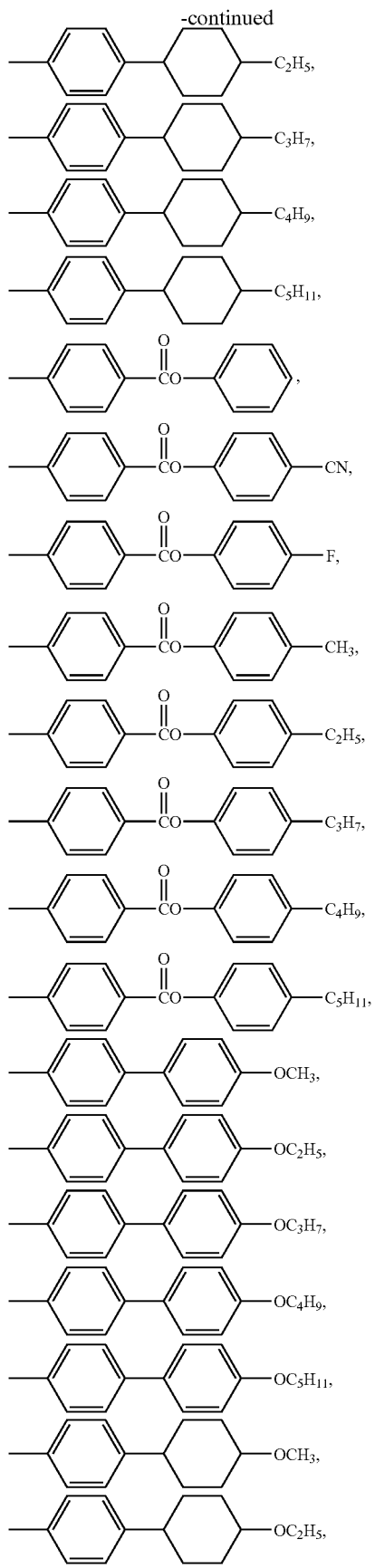

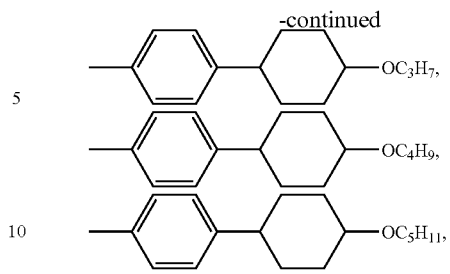

The group (h) is linked to the polymerizable group such as the acrylic group or methacrylic group by a linkage group known as a spacer. In those cases where a spacer exists, the group (h) and the polymerizable group exhibit comparatively independent mobility. The mobility of the group (h) is unaffected by the mobility of the polymer main chain, meaning the group (h) is able to readily adopt the alignment restraining force adopted by the surrounding polymerizable liquid crystal, thereby enabling orientation in the same alignment direction.

The spacer should include an essentially straight-chain chemical structure such as an alkyl group or alkenyl group, but may also include some branch chains within the structure, and may include internal linkage groups such as ester linkages, amide linkages, or ether linkages.

Specifically, the acrylic copolymer H used in the present invention is obtained using mainly a mono(meth)acrylate containing a fluorine group, and a mono(meth)acrylate containing the aforementioned group (h) as the raw materials.

(Mono(meth)acrylate containing a Fluoroalkyl Group)

Amongst the possible mono(meth)acrylates containing an aforementioned fluorine group, mono(meth)acrylates containing a fluoroalkyl group of 1 to 18 carbon atoms in which at least one hydrogen atom of the alkyl group has been substituted with a fluorine atom (although methylene groups within the group may, in some cases, be substituted, mutually independently, with a —$SO_2NZ_2$- or —$CONZ_2$- group, wherein $Z_2$ represents an alkyl group, and moreover, the fluoroalkyl group may also include other substituent groups such as a hydroxyl group or the like) are preferred. The number of fluorine atoms within the fluoroalkyl group is preferably within a range from 5 to 35, and even more preferably from 13 to 25. Specifically, fluoroalkyl groups such as those represented by —$(CH_2)_p$—$(C_qH_sF_{2q-s+1})$, —$(CH_2)_p$—NG-$SO_2$—$(CF_2)_q$—$CF_3$, and —$(CH_2)_p$—NG-CO—$(CF_2)_q$—$CF_3$ (wherein, p and q each represent, independently, an integer from 1 to 17 (provided p+q is at least 2 but no greater than 17), s represents an integer from 0 to 9, G represents an alkyl group of 1 to 8 carbon atoms or a hydrogen atom, and each of the hydrogen atoms bonded to the various methylene groups may be substituted with a hydroxyl group) are preferred. Of these, groups in which p is from 1 to 4 and q is from 2 to 16 are preferred, and groups in which p is from 2 to 3 and q is from 5 to 16 are particularly desirable. The value of q is most preferably within a range from 6 to 11.

Of the various mono(meth)acrylates containing a fluoroalkyl group, those compounds represented by a general formula (4) below are preferred.

$$H_2C=CX—COO-Z \tag{4}$$

In the formula (4), X represents a hydrogen atom or a methyl group. Of these, a hydrogen atom is preferred. Z represents a fluoroalkyl group of 1 to 18 carbon atoms in which at least one hydrogen atom of the alkyl group has been substituted with a fluorine atom (although methylene groups within the group may, in some cases, be substituted, mutually independently, with a —SO$_2$NZ$_2$- or -CONZ$_2$- group, wherein Z$_2$ represents an alkyl group, and moreover, the fluoroalkyl group may also include other substituent groups such as a hydroxyl group or the like).

As follows is a list of specific examples of mono(meth) acrylates containing a fluoroalkyl group that can be used in the present invention.

CF$_3$(CF$_2$)$_n$CH$_2$CH$_2$OCOCH=CH$_2$
(wherein, n is from 5 to 11, and the average of n=9)
CF$_3$(CF$_2$)$_7$CH$_2$CH$_2$OCOC(CH$_3$)=CH$_2$
CF$_3$(CF$_2$)$_7$CH$_2$CH$_2$OCOCH=CH$_2$
CF$_3$(CF$_2$)$_5$CH$_2$CH$_2$OCOC(CH$_3$)=CH$_2$
(CF$_3$)$_2$CF(CF$_2$)$_6$(CH$_2$)$_3$OCOCH=CH$_2$
(CF$_3$)$_2$CF(CF$_2$)$_{10}$(CH$_2$)$_3$OCOCH=CH$_2$
CF$_3$(CF$_2$)$_7$SO$_2$N(C$_3$H$_7$)CH$_2$CH$_2$OCOCH=CH$_2$
CF$_3$(CF$_2$)$_7$SO$_2$N(CH$_3$)CH$_2$CH$_2$OCOC(CH$_3$)=CH$_2$
CF$_3$(CF$_2$)$_7$SO$_2$N(CH$_3$)CH$_2$CH$_2$OCOCH=CH$_2$
CF$_3$(CF$_2$)$_7$(CH$_2$)$_4$OCOCH=CH$_2$
CF$_3$(CF$_2$)$_6$COOCH=CH$_2$
CF$_3$(CF$_2$)$_7$SO$_2$N(C$_4$H$_9$)(CH$_2$)$_4$OCOCH=CH$_2$
CF$_3$(CF$_2$)$_7$CH$_2$CH(OH)CH$_2$OCOCH=CH$_2$
CF$_3$(CF$_2$)$_5$CON(C$_3$H$_7$)CH$_2$CH$_2$OCOC(CH$_3$)=CH$_2$
CF$_3$(CF$_2$)$_7$CON(C$_2$H$_5$)CH$_2$CH$_2$OCOCH=CH$_2$ (Mono(meth)acrylate Containing a Group (h))

A mono(meth)acrylate containing an aforementioned group (h) is preferably a compound represented by a general formula (1).

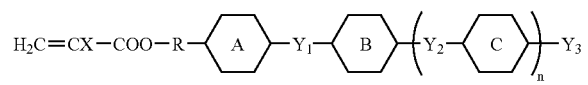

(1)

In the formula (1), X represents a hydrogen atom or a methyl group. Of these, a hydrogen atom is preferred. R represents a spacer, and represents an alkylene group of 1 to 18 carbon atoms (although within the group, either one, or two or more methylene groups that are not bonded directly to the —COO— group may be substituted, mutually independently, with an —O— group, provided the oxygen atoms are not bonded directly to each other). Specific examples of R include —(CH$_2$)$_t$—O—, —(CH$_2$)$_{t'}$—, and —(CH$_2$CH$_2$O)$_{t''}$— (wherein, t, t', and t" each represent an integer from 1 to 18). Of these, alkylene groups of 5 to 15 carbon atoms are preferred, alkylene groups of 5 to 10 carbon atoms are even more preferred, and alkylene groups of 5 to 8 carbon atoms are the most desirable. The 6-membered ring A, the 6-membered ring B, the 6-membered ring C, and the groups Y$_1$, Y$_2$, and Y$_3$ all represent the same groups as those defined in relation to the above general formula (h). n represents the same integer as that described for the general formula (h).

The acrylic copolymer H within the polymerizable liquid crystal composition has the effect of suppressing defects in the vicinity of the air interface, but the alignment effect varies slightly depending on the structure of the group (h) incorporated within the acrylic copolymer H.

It is already known that, typically, the alignment force applied to the liquid crystal compound by the group (h) is determined by the structure represented by Y$_3$ in the general formula (h), and the spacer portion (specifically, the structures of the spacer represented by R and the portion represented by Y$_3$ within the structure represented by R-[6-membered ring A]-[6-membered ring B]-(Y$_2$-[6-membered ring C])$_n$—Y$_3$ in the general formula (1)).

If Y$_3$ is an alkyl group, alkoxy group, alkenyl group or alkenyloxy group of 1 to 20 carbon atoms, then the alignment force of the group (h) strengthens, and the group develops an alignment restraining force on the liquid crystal compound. In contrast, if Y$_3$ is a hydrogen atom, then the alignment force of the group (h) weakens, and the group tends to exhibit no alignment restraining force on the liquid crystal compound.

On the other hand, if the length of the spacer represented by R is overly short, then the mobility of the group (h) deteriorates, the crystallinity of the (meth)acrylic copolymer H itself increases, and self-alignment forces tend to strengthen. Furthermore, if the spacer is overly long, then the crystallinity of the spacer itself increases, which also tends to result in a strengthening of self-alignment forces.

Examples of groups (h) that exhibit weak alignment force include those groups in which Y$_3$ is a hydrogen atom, such as a biphenyl group or phenylcyclohexyl group. Because these groups exhibit only extremely weak alignment forces, they are thought to exhibit almost no alignment restraining force on other groups.

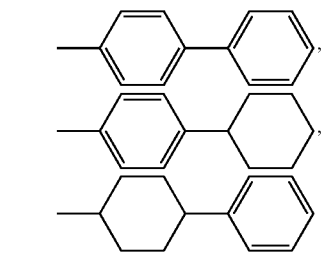

If an acrylic copolymer H containing an aforementioned group (h) with weak alignment properties is used, then an optically anisotropic medium with no defects in which the alignment restraining force imparted at the substrate side of the layer is transmitted faithfully through to the vicinity of the air interface can be obtained. It is thought that this observation reflects the fact that because the alignment restraining force imparted to the liquid crystal compound within the polymerizable liquid crystal composition by the group (h) is weak, it does not interfere with the alignment restraining force imparted to the liquid crystal compound of the polymerizable liquid crystal composition by the substrate, meaning the liquid crystal compound can be aligned right through to the vicinity of the air interface.

An acrylic copolymer H containing an aforementioned group (h) with weak alignment properties, when mixed with or brought into contact with the polymerizable liquid crystal composition excluding the acrylic copolymer H, lowers the liquid-liquid crystal transition temperature of the polymerizable liquid crystal composition. (Hereafter, the composition including the polymerizable liquid crystal composition of the present invention but excluding the acrylic copolymer H is referred to as the "polymerizable liquid crystal composition b".)

FIG. 1 shows the relationship between the quantity of acrylic copolymer H added and the liquid-liquid crystal transition temperature, as an acrylic copolymer H containing an aforementioned group (h) with weak alignment properties is added to the polymerizable liquid crystal composition b. Here, the expression "liquid-liquid crystal transition temperature" is determined by lowering the temperature of the liquid crystal composition from a liquid state while conducting continuous analysis by differential scanning calorimetry (DSC), and refers to the peak top of the DSC peak that corresponds with the phase transition from the liquid state. From this figure, it is evident that as the quantity of the acrylic copolymer H added increases, the liquid-liquid crystal transition temperature decreases.

The acrylic copolymer H is designed so as to accumulate within the vicinity of the air interface of the polymerizable liquid crystal composition (as described below). Accordingly, in a polymerizable liquid crystal composition of the present invention containing the acrylic copolymer H, the liquid-liquid crystal transition temperature in the vicinity of the air interface decreases, and it is thought that this enables the alignment restraining force from the substrate surface to function more effectively than the alignment restraining force from the air interface, meaning an optically anisotropic medium in which the alignment restraining force from the substrate is transmitted even more faithfully through to the vicinity of the interface can be obtained, thereby enabling a favorable alignment defect suppression effect to be achieved.

The polymerizable liquid crystal composition b that is combined with the aforementioned acrylic copolymer H containing a group (h) with weak alignment properties is preferably a polymerizable liquid crystal composition b that exhibits a liquid crystal mixing property such that the difference between the liquid-liquid crystal transition temperature ($T_h$) for a liquid crystal obtained by adding an excess (20% by weight) of the acrylic copolymer H to the polymerizable liquid crystal composition b, and the liquid-liquid crystal transition temperature ($T_0$) for the polymerizable liquid crystal composition b (hereafter, this difference is defined as the mixing liquid crystal temperature reduction $\Delta T$), namely $\Delta T = T_h - T_0$, is within a range from $-10°$ C. to $-0.1°$ C. This relationship is expressed by the formula shown below.

$$\Delta T = T_h - T_0$$

(wherein, $T_h$=(the liquid-liquid crystal transition temperature when the aforementioned polymerizable liquid crystal composition includes 20% by weight of the above acrylic copolymer H), and $T_0$=(the liquid-liquid crystal transition temperature of a composition in which the acrylic copolymer H is excluded from the above polymerizable liquid crystal composition (the polymerizable liquid crystal composition b)))

However, if the value of the mixing liquid crystal temperature reduction $\Delta T$ represents an overly large temperature reduction, then the stability of the polymerizable liquid crystal composition itself may deteriorate, so the composition is preferably combined so that the temperature reduction does not exceed $10°$ C.

This type of combination is particularly favorable in terms of obtaining an optically anisotropic medium with no defects in which the alignment restraining force from the substrate side is transmitted faithfully through to the vicinity of the air interface. This combination is particularly favorable in those cases where the alignment restraining force from the substrate side is an approximately horizontal alignment force, enabling an optically anisotropic medium with a large optical anisotropy when viewed from a direction perpendicular to the substrate surface to be obtained.

Acrylic copolymers H that employ a biphenyl group or phenylcyclohexyl group as the group (h) exhibit the greatest effect on the level of defects. More specifically, acrylic copolymers H containing from 9 to 95 mol% of structural units represented by a general formula (2-1), and from 3 to 45 mol% of structural units represented by a general formula (3-1) are the most desirable. The structural units represented by the general formula (2-1) provide better effects at large mol% values, and proportions from 60 to 95 mol% are preferred, and proportions from 70 to 90 mol% are even more desirable. Furthermore, the proportion of the structural units represented by the general formula (3-1) is preferably within a range from 3 to 36 mol%, even more preferably from 5 to 25 mol%, and most preferably from 10 to 25 mol%.

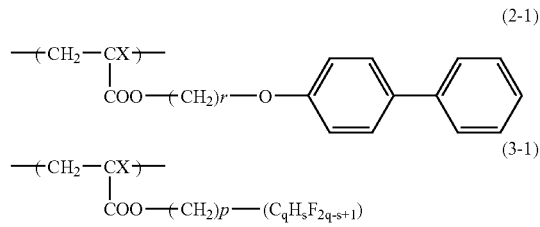

In the above formulas, X represents a hydrogen atom or a methyl group, r represents an integer from 1 to 18, p represents an integer from 1 to 8, q represents an integer from 1 to 13 (provided p+q is at least 2 but no greater than 17), and s represents an integer from 0 to 7.

Of these possibilities, r is preferably within a range from 5 to 15, even more preferably from 5 to 10, and is most preferably from 5 to 8. Furthermore, in terms of ease of availability of the compounds, p is preferably 2, and q is preferably an odd number within a range from 5 to 11.

On the other hand, examples of groups (h) that exhibit a comparatively powerful alignment restraining force include 4-alkylbiphenyl groups and 4-alkylcyclohexylphenyl groups. Amongst these groups, in the present invention, the selection of groups for which the alignment restraining force is smaller than the alignment restraining force of the liquid crystal molecules in the polymerizable liquid crystal composition is preferred. If an acrylic copolymer H containing a group (h) with comparatively strong alignment properties is used, then an optically anisotropic medium that is controlled by the alignment restraining force from the substrate side and the alignment restraining force in the vicinity of the air interface can be obtained. Because the acrylic copolymer H used in the present invention contains the group (h) as pendant groups in random positions along the acrylic chain, although each of the groups (h) has an alignment restraining force, an average alignment restraining force of the groups (h) is able to be transmitted to the liquid crystal molecules within the polymerizable liquid crystal composition.

Specific examples of mono(meth)acrylates containing a group (h) that can be used in the present invention are shown below.

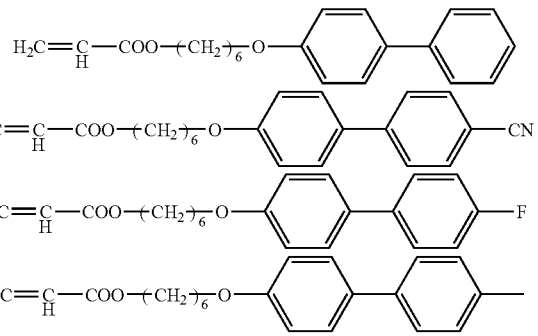

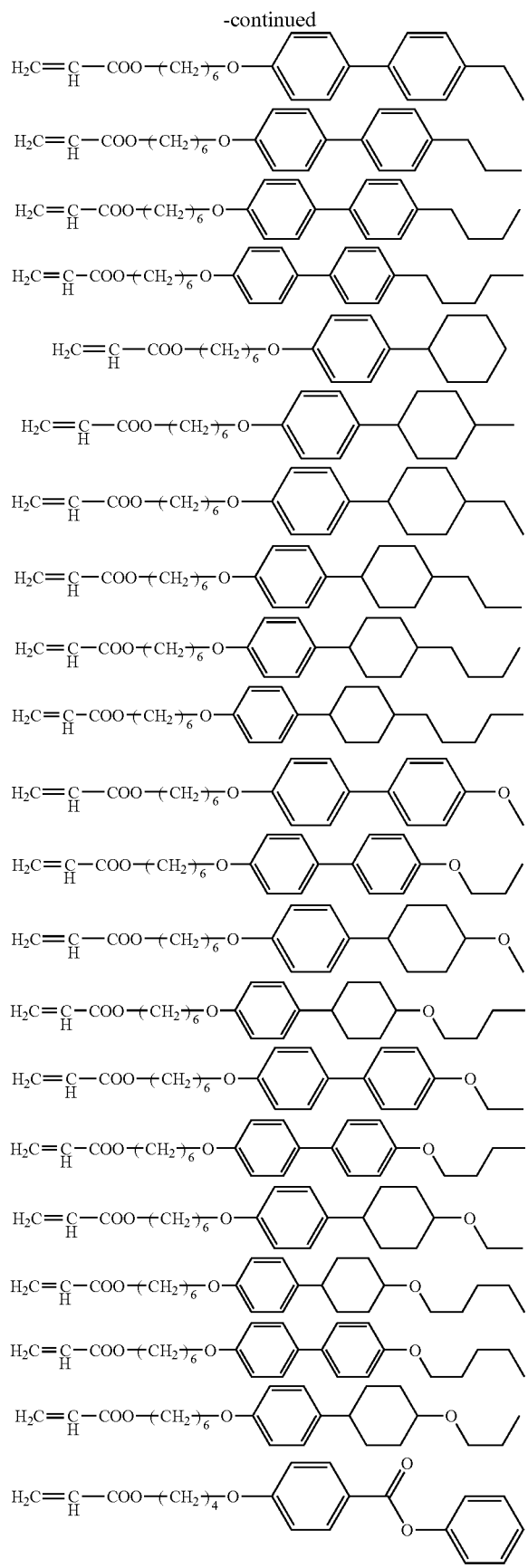

The acrylic copolymer H can be produced by copolymerizing, as essential raw materials, a mono(meth)acrylate containing a group represented by the general formula (h), and a mono(meth)acrylate containing a fluorine group such as a fluoroalkyl group. There are no particular restrictions on the copolymerization method used, and a conventional synthesis method employing a known polymerization initiator can be used. Any of the various polymerization techniques can be used, including bulk polymerization, solution polymerization, emulsion polymerization, suspension polymerization, radiation-initiated polymerization, and photopolymerization. Of these, solution-based radical polymerization methods are preferred.

Examples of suitable polymerization initiators include benzoyl peroxide and 2,2'-azobisisobutyronitrile. The polymerization can be conducted using any of a variety of solvents, including aromatic hydrocarbons such as benzene, toluene and xylene; aliphatic hydrocarbons such as hexane, heptane and cyclohexane; esters such as ethyl acetate and ethylene glycol monoethyl ether acetate; ketones such as acetone, methyl ethyl ketone, methyl isobutyl ketone and cyclohexanone; and alcohol-based or ether-based solvents such as methanol, ethanol, isopropanol, n-butanol, isobutanol, diglyme and ethylene glycol monoethyl ether. The mono(meth)acrylate containing a group represented by the general formula (h), and the mono(meth)acrylate containing a fluoroalkyl group are preferably dissolved in a solvent, and then subjected to deaeration or nitrogen replacement treatment in order to enable the polymerization reaction to proceed more readily.

The weight average molecular weight (hereafter abbreviated as Mw) of the acrylic copolymer H, measured by gel permeation chromatography (GPC) against polystyrene standards, is typically within a range from 10,000 to 300,000, and is preferably within a range from 12,000 to 200,000, and even more preferably from 20,000 to 100,000.

If the Mw value is less than 10,000, then the effect of the present invention in improving the level of defects is weak, and the alignment properties tend to deteriorate. Furthermore, because the molecular weight is relatively small, the copolymer is more readily eluted, increasing the danger of contamination of other members.

In contrast if the Mw value exceeds 300,000, then the viscosity becomes overly high, which causes problems in terms of handling, and increases the danger that the copolymer will undergo complete phase separation from the liquid crystal layer, making it impossible for the effects of the present invention to manifest.

The Mw value of the acrylic copolymer H can be controlled by conventional methods, including altering factors such as the concentration of the monomers within the solution, the nature and concentration of the polymerization initiator, the nature of the solvent, and the reaction conditions, and these conditions should be selected in accordance with the desired objectives. For example, if an aprotic solvent is used as the solvent medium, then an acrylic copolymer H with a comparatively higher molecular weight is obtained, whereas if a protic solvent is used, an acrylic copolymer H with a comparatively lower molecular weight is obtained.

The fluorine group content within the acrylic copolymer H is typically within a range from 3 to 30% by weight, and the ratio of the side chains containing the group (h) relative to the combined total of all the side chains is within a range from 9 to 95 mol%. By ensuring that both these factors are balanced in this manner, the level of defects in the vicinity of the air interface can be improved effectively with only a small quantity of the copolymer. Of the various possibilities, copolymers in which the fluorine group content is within a range from 5 to 30% by weight and the ratio of side chains containing the group (h) relative to the combined total of all the side chains is within a range from 9 to 95 mol% are preferred, copolymers in which the fluorine group content is from 5 to 25% by weight and the ratio of side chains containing the group (h) relative to the combined total of all the side chains is from 60 to 95 mol% are even more preferred, and copolymers in which the fluorine group content is from 7 to 25% by weight and the ratio of side chains containing the group (h) relative to the combined total of all the side chains is from 70 to 90 mol% are the most desirable.

Here, the "fluorine group content" represents the weight% of the fluorine atoms within the acrylic copolymer H relative to the total weight, and the "ratio of side chains containing the group (h) relative to the combined total of all the side chains" represents the mol% of side chains containing the group (h) relative to all the monomer units.

In those cases where the fluorine group content of the acrylic copolymer H is greater than 30% by weight, or the ratio of group (h)-containing side chains is less than 9 mol%, the force leading to concentration of the copolymer at the interface between the liquid crystal layer and the air becomes overly strong, or the affinity of the copolymer for the polymerizable liquid crystal becomes overly weak, and so the groups (h) are also forced out from the liquid crystal layer, which tends to make it more difficult to obtain the desired improvement in defects within the liquid crystal molecules.

In contrast, in those cases where the fluorine group content of the acrylic copolymer H is less than 3% by weight, or the ratio of group (h)-containing side chains is greater than 95 mol%, the force leading to co-solubility of the groups (h) within the liquid crystal layer becomes overly strong, and the force that leads to concentration of the copolymer in the vicinity of the air interface weakens, meaning the copolymer tends to become mixed into the liquid crystal layer. This increases the danger of adverse effects such as increased distortion within the alignment of the liquid crystal layer, and variation in the transition point.

The above fluorine group content can be set to a desired level by altering the relative blend quantities of the mono(meth)acrylate containing the group (h) and the mono(meth)acrylate containing the fluorine group, and by altering the fluorine group content within the mono(meth)acrylate containing the fluorine group.

The fluorine group content can be measured either by calculation based on the fluorine group content within the raw material mono(meth)acrylate containing the fluorine group, and the blend quantity used of that raw material during copolymerization, or by NMR methods or the like.

By conducting a copolymerization using a mono(meth)acrylate containing a group (h) represented by the above general formula (1) and a mono(meth)acrylate containing a fluoroalkyl group represented by the above general formula (4) as the essential raw materials, an acrylic copolymer H containing structural units represented by a general formula (2), and structural units represented by a general formula (3), which represents a particularly preferred embodiment of the present invention, can be obtained.

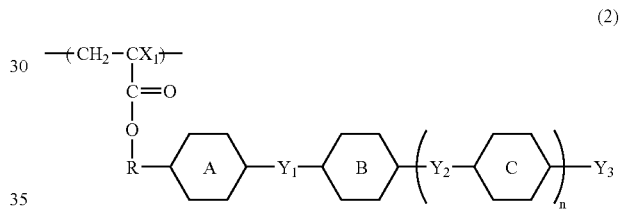

In the general formula (2), R, the 6-membered ring A, the 6-membered ring B, the 6-membered ring C, and the groups $Y_1$, $Y_2$, and $Y_3$ all represent the same groups as those defined in relation to the above general formula (1). n represents the same integer as that described for the general formula (1). $X_1$ and $X_2$ each represent, independently, a hydrogen atom or a methyl group, whereas in the general formula (3), Z represents a fluoroalkyl group of 1 to 18 carbon atoms in which at least one hydrogen atom has been substituted with a fluorine atom.

The respective quantities of the structural units represented by the general formula (2) and the structural units represented by the general formula (3) are preferably such that the copolymer contains from 9 to 95 mol% of structural units represented by the general formula (2) and from 3 to 45 mol% of structural units represented by the general formula (3). Of such copolymers, those containing from 60 to 95mol% of structural units represented by the general formula (2) and from 5 to 25 mol% of structural units represented by the general formula (3) are particularly desirable. There are no particular restrictions on the bonding sequence of the structural units represented by the general formula (2) and the structural units represented by the general formula (3), and structural units of the general formula (2) or structural units of the general formula (3) may be linked together in sequence, or the structural units of the general formula (2) and the structural units of the general formula (3) may be bonded together in an alternating sequence.

Preferred examples of the acrylic copolymer H include copolymers of 4-(6-acryloyloxyhexyloxy)phenylbenzene and 1H,1H,2H,2H-heptadecafluorodecyl acrylate, copolymers of 4-(6-acryloyloxyhexyloxy)phenyl-trans-cyclohexane and 1H,1H,2H,2H-heptadecafluorodecyl acrylate, copolymers of 1-cyano-4-(4-(6-acryloyloxyhexyloxy)phenyl)benzene and 1H,1H,2H,2H-heptadecafluorodecyl acrylate, copolymers of 1-propyl-4-(4-(8-acryloyloxyoctyloxy)phenyl)trans-cyclohexane and 1H,1H,2H,2H-heptadecafluorodecyl acrylate, copolymers of 1-fluoro-4-(4-(4-acryloyloxybutyloxy)phenyl)benzene and 1H,1H,2H,2H-nonadecafluorododecyl acrylate, and copolymers of 1-pentyl-4-(4-(11-acryloyloxyundecyloxy)phenyl)trans-cyclohexane and 1H,1H,2H,2H-heptadecafluorodecyl acrylate.

Moreover, besides the mono(meth)acrylate containing the group (h) and the mono(meth)acrylate containing the fluoroalkyl group, other copolymerizable conventional ethylenic monomers may also be included in the monomer, provided such inclusion does not impair the effects of the present invention. Examples of these conventional ethylenic monomers include ethylene, propylene, vinyl chloride, vinylidene chloride, styrene, α-methylstyrene, vinyl acetate, methyl (meth)acrylate, ethyl (meth)acrylate, n-butyl (meth)acrylate, iso-butyl (meth)acrylate, tert-butyl (meth)acrylate, hexyl (meth)acrylate, n-octyl (meth)acrylate, 2-ethylhexyl (meth) acrylate, decyl (meth)acrylate, dodecyl (meth)acrylate, hexadecyl (meth)acrylate, stearyl (meth)acrylate, isostearyl (meth)acrylate, benzyl (meth)acrylate, cyclohexyl (meth) acrylate, isobornyl (meth)acrylate, dicyclopentanyl (meth) acrylate, dicyclopentenyl (meth)acrylate, methyl vinyl ether, propyl vinyl ether, octyl vinyl ether, butadiene, isoprene, chloroprene, 2-hydroxyethyl (meth)acrylate, (meth)acrylic acid, (meth)acrylamide, N-methylol (meth)acrylamide, 3-chloro-2-hydroxy (meth)acrylate, diacetone acrylamide, n-cetyl (meth)acrylate, n-stearyl (meth)acrylate, n-behenyl (meth)acrylate, iso-stearyl (meth)acrylate, acetoacetoxyethyl acrylate, acetoacetoxyethyl methacrylate, acetoacetoxyethyl crotonate, acetoacetoxypropyl acrylate, acetoacetoxypropyl methacrylate, acetoacetoxypropyl crotonate, 2-cyanoacetoacetoxyethyl methacrylate, N-(2-acetoacetoxyethyl)acrylamide, N-(2-acetoacetoxyethyl)methacrylamide, allyl acetoacetate, and vinyl acetoacetate. These monomers may also be combined in mixtures of two or more compounds. Furthermore, of these ethylenic monomers, those containing a functional group such as a carboxyl group, amino group, amide group or urethane group can produce undesirable effects such as gelling during the polymerization or reaction during storage, thereby shortening the lifespan of the copolymer, although if the quantities are kept to very small amounts, then copolymerization is still possible.

The quantity used of the above conventional ethylenic monomers is preferably restricted to a quantity that does not impair the functions of the acrylic copolymer H, and is preferably no more than 60% by weight, and most preferably no more than 30% by weight.

(Liquid Crystal Compound having a Polymerizable Group)

A polymerizable liquid crystal composition of the present invention contains from 0.1 to 6.0% by weight of the acrylic copolymer H, and a liquid crystal compound having a polymerizable group such as a (meth)acryloyl group, vinyloxy group, or epoxy group.

In the present invention, the polymerizable liquid crystal composition of the present invention must exhibit a liquid crystalline phase, but all of the polymerizable liquid crystal compounds used need not necessarily exhibit a liquid crystalline phase. Examples of polymerizable liquid crystal compounds that can be used in the present invention include not only compounds that exhibit a liquid crystalline phase in isolation, but also compounds that do not exhibit a liquid crystalline phase in isolation, but will develop a liquid crystalline phase if the melting point is lowered, compounds that exhibit a liquid crystalline phase when mixed with other compounds that exhibit a liquid crystalline phase, and compounds that have similar structures to compounds that exhibit a liquid crystalline phase and do not significantly effect the stability of the liquid crystalline phase formed by other compounds that exhibit a liquid crystalline phase.

There are no particular restrictions on the polymerizable liquid crystal compound used in the present invention, and suitable examples include the liquid crystal compounds disclosed in Japanese Unexamined Patent Application, First Publication No. Hei 08-3111, the liquid crystal compounds disclosed in Japanese Unexamined Patent Application, First Publication No. 2000-178233, the liquid crystal compounds disclosed in Japanese Unexamined Patent Application, First Publication No. 2000-119222, the liquid crystal compounds disclosed in Japanese Unexamined Patent Application, First Publication No. 2000-327632, the liquid crystal compounds disclosed in Japanese Unexamined Patent Application, First Publication No. 2002-220421, the liquid crystal compounds disclosed in Japanese Unexamined Patent Application, First Publication No. 2003-55661, and the liquid crystal compounds disclosed in Japanese Unexamined Patent Application, First Publication No. 2003-12762. Of these, polymerizable liquid crystal compounds that exhibit a nematic liquid crystalline phase are preferred, and the use of a rod-shaped bifunctional polymerizable liquid crystal compound or trifunctional polymerizable liquid crystal compound having polymerizable groups at both terminals of the group (h) is preferred as it enables the aligned state to be favorably fixed. The use of bifunctional polymerizable liquid crystal compounds is particularly desirable. Furthermore, in order to enable regulation of the viscosity or the temperature at which the liquid crystalline phase is exhibited, the joint use of a rod-shaped monofunctional polymerizable liquid crystal compound having a polymerizable group at one terminal of the group (h) is also desirable.

The acrylic copolymer H is used in a quantity equivalent to 0.1 to 6.0% by weight relative to the total weight of the polymerizable liquid crystal composition of the present invention. This quantity is preferably within a range from 0.2 to 3.0% by weight, even more preferably from 0.2 to 2.0% by weight, and is most preferably from 0.3 to 1.5% by weight. At quantities less than 0.1% by weight, the copolymer is unable to generate a uniform film at the surface layer, and completely eliminating defects is impossible. In contrast, at quantities exceeding 6.0% by weight, the entire quantity of the copolymer cannot be concentrated within the surface layer, meaning a portion remains within the interior of the layer, and this increases the danger of phase separation occurring between the copolymer and the polymerizable liquid crystal, and of the groups (h) within the residual acrylic copolymer H inside the layer disturbing the alignment of the surrounding polymerizable liquid crystal and generating a multi-domain system. Moreover, there is also a possibility of deterioration in heat resistance, and deterioration in the optical characteristics such as the development of haze.

The acrylic copolymer H may also use a combination of a plurality of copolymers.

Figure 2:
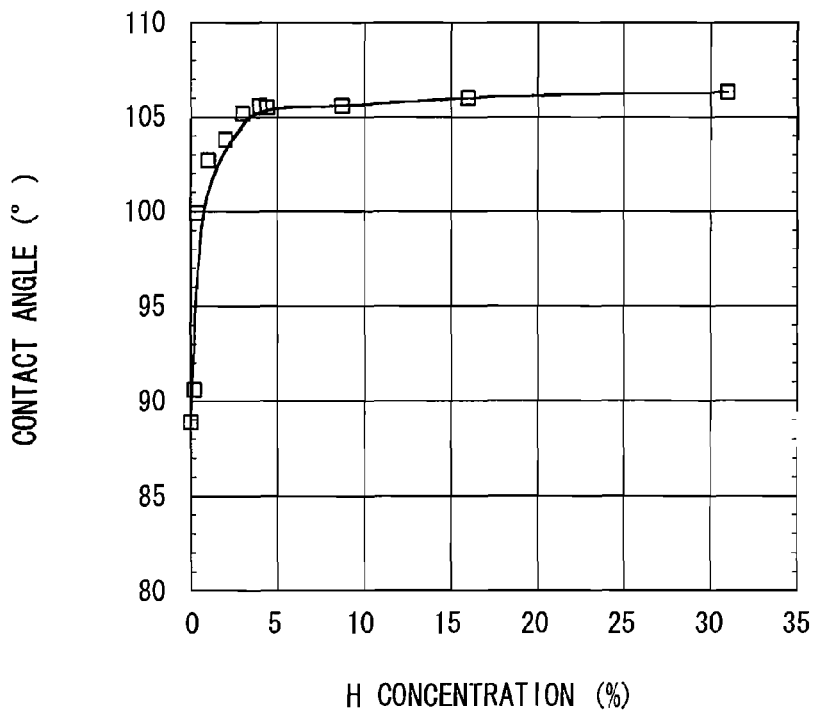
FIG. 2 is a diagram showing the relationship between the quantity of the (meth)acrylic copolymer (H) added to the polymerizable liquid crystal composition, and the contact angle with water (in the diagram, "H concentration (%)" is the quantity added of the acrylic copolymer (H), expressed as a %).

The relationship between the quantity of the acrylic copolymer H added to the polymerizable liquid crystal composition of the present invention, and the wettability of the surface of the obtained optically anisotropic medium (which is represented by the contact angle relative to water, wherein a larger water contact angle indicates greater water repellency, which indicates that the fluorine groups of the acrylic copolymer H are concentrated at the surface) is shown in FIG. 2. From this figure, it is evident that the contact angle with water increases dramatically even when the quantity of acrylic copolymer H added is only 0.1% by weight, and that the contact angle reaches a plateau at approximately 6% by weight. In other words, it can be surmised that the addition of 0.1% by weight is sufficient to eliminate surface defects on the optically anisotropic medium Accordingly, addition quantities of at least 0.1% by weight provide an adequate effect in suppressing defects at the surface.

However, if the quantity of copolymer added is increased even further, then the quantity of the acrylic copolymer H concentrated near the surface does not increase. This fact indicates that any excess copolymer is penetrating into the bulk of the liquid crystal layer, and at quantities exceeding 6.0% by weight, it is thought that the copolymer causes phase separation and disrupts the liquid crystalline alignment within the bulk of the liquid crystal layer.

A polymerizable liquid crystal composition of the present invention may also include, where necessary, an added liquid crystal compound having no polymerizable group. However, if the quantity added is too large, then there is a danger that liquid crystal compound may be eluted from the optically anisotropic medium and contaminate the laminated members, and there is also a danger of a decrease in the heat resistance of the optically anisotropic medium, and consequently if such a liquid crystal compound is added, the quantity is preferably no higher than 30% by weight, even more preferably no higher than 15% by weight, and most preferably no higher than 5% by weight, relative to the total weight of the polymerizable liquid crystal composition.

If required, a polymerization initiator such as a heat polymerization initiator or photopolymerization initiator may also be added to a polymerizable liquid crystal composition of the present invention. Examples of suitable heat polymerization initiators include benzoyl peroxide and 2,2'-azobisisobutyronitrile. Furthermore, examples of suitable photopolymerization initiators include benzoin ethers, benzophenones, acetophenones, benzyl ketals, and thioxanthones. Furthermore, photoacid generators can also be used as photocationic initiators. Examples of suitable photoacid generators that can be used include diazodisulfone-based compounds, triphenylsulfonium-based compounds, phenylsulfonium-based compounds, sulfonylpyridine-based compounds, triazine-based compounds, and diphenyliodonium compounds. If added, the quantity of the polymerization initiator is preferably no more than 10% by weight, even more preferably no more than 6% by weight, and most preferably within a range from 1 to 4% by weight, relative to the weight of the polymerizable liquid crystal composition.

A polymerizable liquid crystal composition of the present invention may also include compounds that contain a polymerizable group but are not polymerizable liquid crystal compounds. These types of compounds can use, without any particular restrictions, any of the compounds typically recognized in this technical field as appropriate polymerizable monomers or polymerizable oligomers. If added, the quantity of such compounds is preferably no more than 5% by weight, and even more preferably 3% by weight or less relative to the weight of the polymerizable liquid crystal composition.

In a polymerizable liquid crystal composition of the present invention, compounds with optical activity, so-called chiral compounds, may also be added. These chiral compounds need not necessarily exhibit a liquid crystalline phase themselves, and may either contain, or not contain, a polymerizable group. Furthermore, the direction of the helix of the chiral compound can be selected in accordance with the intended application for the polymer.

Specific examples of such chiral compounds include cholesterol pelargonate or cholesterol stearate, which contain a cholesteryl group as the chiral group, the products "CB-15" and "C-15" manufactured by BDH Ltd., the product "S-1082" manufactured by Merck & Co., Inc., and the products "CM-19", "CM-20" and "CM" manufactured by Chisso Corporation, which all contain a 2-methylbutyl group as the chiral group, and the product "S-811" manufactured by Merck & Co., Inc., and the products "CM-21" and "CM-22" manufactured by Chisso Corporation, which contain a 1-methylheptyl group as the chiral group.

In those cases where a chiral compound is added, although dependent on the intended application for the copolymer of the polymerizable liquid crystal composition of the present invention, generally, the quantity of the chiral compound is preferably set so that the thickness (d) of the obtained polymer divided by the helical pitch (P) within the polymer (that is, d/P) falls within a range from 0.1 to 100, and even more preferably from 0.1 to 20.

Stabilizers may also be added to a polymerizable liquid crystal composition of the present invention in order to improve the storage stability. Examples of suitable stabilizers include hydroquinone, hydroquinone monoalkyl ethers, tertiary butyl catechols, pyrogallols, thiophenols, nitro compounds, β-naphthylamines, and β-naphthols. When added, the quantity of such stabilizers is preferably no more than 1% by weight, and even more preferably no more than 0.5% by weight, relative to the polymerizable liquid crystal composition of the present invention.

In those cases where a polymerizable liquid crystal composition of the present invention is used for applications such as the raw material for a polarizing film or an alignment film, or as a printing ink, coating material, or protective film, other additives may also be added to the composition in accordance with the intended application, including metals, metal complexes, dyes, pigments, fluorescent materials, phosphorescent materials, surfactants, leveling agents, thixotropic agents, gelling agents, polysaccharides, ultraviolet absorbers, infrared absorbers, antioxidants, ion exchange resins, and metal oxides such as titanium oxide.

An optically anisotropic medium of the present invention can be obtained by applying a polymerizable liquid crystal composition of the present invention to a substrate that exhibits an alignment function, uniformly aligning the liquid crystal molecules within the polymerizable liquid crystal composition of the present invention so that the molecules are retained in a nematic phase, and then polymerizing the composition.

(Substrate that Exhibits an Alignment Function)

The above substrate may be either organic or inorganic, and may be formed from a conventional material. Examples of suitable substrates include a polyethylene terephthalate sheet, polycarbonate sheet, polyimide sheet, polyamide sheet, polymethyl methacrylate sheet, polystyrene sheet, polyvinyl chloride sheet, polytetrafluoroethylene sheet, cellulose sheet, cellulose triacetate sheet, polyethersulfone sheet, or polycycloolefin sheet, as well as a silicon sheet, glass plate, or calcite plate. The substrate may be either flat, or may include a curved surface. If required, these substrates may also include an electrode layer, or possess an anti-reflective function or reflective function.

There are no particular restrictions on the method employed for imparting an alignment function to the substrate, and conventional methods may be used. Specifically, suitable methods include methods in which the substrate surface is subjected to rubbing treatment with a cloth or the like, methods in which an organic thin film such as a polyimide thin film or a polyvinyl alcohol thin film is formed on the substrate surface, and this thin film is then subjected to rubbing treatment, methods in which $SiO_2$ is deposited on the substrate by oblique deposition to form an alignment film, and methods in which an organic thin film containing a molecule with a functional group that undergoes a photodimerization reaction, or an organic thin film containing a molecule with a functional group that undergoes isomerization under light irradiation, is irradiated with either polarized light or unpolarized light. In order to ensure formation of a uniformly aligned state, if the type of polyimide thin film that is typically used in twisted nematic elements or super twisted nematic elements to impart a pretilt angle is used, then the alignment state of the liquid crystal molecules can be controlled relatively easily Generally, when a liquid crystal composition is brought into contact with a substrate that exhibits an alignment function, the liquid crystal molecules in the vicinity of the substrate are aligned in the direction of the alignment treatment performed on the substrate. Whether the liquid crystal molecules align horizontally across the substrate, or align either at a tilt or perpendicularly relative to the substrate is influenced significantly by the alignment treatment performed on the substrate.

For example, if an alignment film with an extremely small pretilt angle, such as the alignment films used in in-plane switching (IPS) liquid crystal display elements, is provided on the substrate, then a polymerizable liquid crystal layer that is aligned approximately horizontally can be obtained.

Furthermore, if an alignment film such as that used in a TN liquid crystal display element is provided on the substrate, then a polymerizable liquid crystal layer in which the molecules are aligned with a slight tilt is obtained, and if the type of alignment film used in a STN liquid crystal display element is used, then a polymerizable liquid crystal layer in which the molecules are aligned with a large degree of tilt is obtained.

When the liquid crystal composition is brought into contact with a substrate that exhibits a horizontal alignment function with a small pretilt angle (approximately horizontal alignment), the liquid crystal molecules in the composition adopt a true horizontal alignment in the vicinity of the substrate, but because the alignment restraining force is not favorably transmitted to the vicinity of the air interface, some partial distortion occurs within the alignment (which presents as defects). However, in the case of a polymerizable liquid crystal composition of the present invention that contains an acrylic copolymer H, the copolymer H is concentrated in the vicinity of the air interface, and it is thought that this means the alignment restraining force imparted by the substrate to the liquid crystal molecules within the polymerizable liquid crystal composition is not impeded, and as a result, the liquid crystal molecules in the vicinity of the air interface can also be aligned, thereby enabling a polymerizable liquid crystal layer to be obtained in which the molecules are either aligned approximately horizontally, or aligned with an tilt, wherein the tilt angle changes in a progressive manner, and also enabling an optically anisotropic medium with no defects and with a large optical anisotropy when viewed from a direction perpendicular to the substrate surface to be obtained.

In this case, the use of an acrylic copolymer H in which the group (h) is a biphenyl group or phenylcyclohexyl group with a small alignment force is desirable, and the use of a combination of an acrylic copolymer H in which the group (h) is a biphenyl group, and a polymerizable liquid crystal composition b for which the addition of the acrylic copolymer H results in a decrease in the liquid-liquid crystal transition temperature is particularly preferred. With this type of combination, it is thought that because the liquid-liquid crystal transition temperature decreases in the vicinity of the air interface, the alignment restraining force imparted to the liquid crystal molecules by the substrate can be transmitted even more faithfully through to the vicinity of the interface.

Furthermore, when a polymerizable liquid crystal composition of the present invention is brought into contact with a substrate that exhibits a horizontal alignment function with a pretilt angle, an optically anisotropic medium can be obtained in which the molecules are either aligned uniformly from the vicinity of the substrate through to the vicinity of the air interface, or aligned with an tilt wherein the tilt angle changes in a progressive manner. It is thought that the mechanism is similar to that described above.

Furthermore, if a method is employed in which an organic thin film containing a molecule with a functional group that undergoes a photodimerization reaction, or an organic thin film containing a molecule with a functional group that undergoes isomerization under light irradiation (hereafter, this organic film is abbreviated as a "photoalignment film"), is irradiated with either polarized light or unpolarized light (a photoalignmnent method), then a substrate can be obtained in which regions with differing alignment directions are dispersed in a pattern across the substrate.

First, a substrate with a photoalignment film provided thereon is irradiated with light with a wavelength that falls within the absorption band of the photoaligmnent film, thus preparing a substrate with uniform alignment. Subsequently, a mask is used to cover the substrate, and light with a wavelength that falls within the absorption band of the photoalignment film but of a different state from the light of the first irradiation, such as light with a different state of polarization or light for which the irradiation angle or direction is different, is irradiated from above the mask, thereby imparting only the irradiated portions with a different alignment function from the portions obtained as a result of the first irradiation.

If a polymerizable liquid crystal composition is then brought into contact with a substrate obtained in this manner, in which regions with differing alignment functions are dispersed in a pattern across the substrate, then regions of differing alignment directions are dispersed in a pattern corresponding with the alignment functions of the substrate. If polymerization is conducted in this state by irradiating the layer with light, then an optically anisotropic medium having an alignment pattern can be obtained.

If a substrate with an approximately horizontal alignment function in which regions of differing alignment directions are dispersed across the substrate in a pattern is used as the substrate, then an optically anisotropic medium that is particularly useful as a retardation film can be obtained.

The photoalignment film used in such cases must be capable of reacting to multiple light irradiations, and altering the alignment direction in each case, and consequently a film formed from a low molecular weight compound is preferred.

Methods of obtaining an alignment pattern without using a photoalignment film include methods in which an alignment film is subjected to rubbing using an AFM probe, and methods in which an optically anisotropic medium is subjected to etching, but methods using a photoalignment film are more convenient, and consequently preferred.

(Coating Method)

In those cases where a polymerizable liquid crystal composition of the present invention is coated onto a substrate, conventional coating methods can be used, including bar coating, spin coating, roll coating, gravure coating, spray coating, die coating, cap coating, and dipping. In order to improve the coating characteristics, a conventional organic solvent may be added to the polymerizable liquid crystal composition of the present invention. In such cases, following application of the polymerizable liquid crystal composition of the present invention to the substrate, the organic solvent is removed by a process such as natural drying, heat drying, reduced pressure drying, or reduced pressure heat drying.

Following application, the liquid crystal molecules within the polymerizable liquid crystal composition of the present invention are preferably aligned uniformly while retained in a nematic phase. Specifically, if a heat treatment that promotes the liquid crystal alignment is conducted, then the acrylic copolymer H can be further concentrated at the surface, enabling even better facilitation of the alignment process. In one example of a heat treatment, the polymerizable liquid crystal composition of the present invention is applied to the substrate, and is then heated at a temperature at least as high as the transition temperature between the N-phase (nematic phase) and the I-phase (isotropic liquid phase) of the liquid crystal composition (hereafter abbreviated as the N-I transition temperature), thereby placing the liquid crystal composition in an isotropic liquid phase state. Subsequently, the composition can be cooled as required to develop the nematic phase. At this point, the temperature is preferably held at a level that supports the liquid crystalline phase, so that the liquid crystalline phase domain can be grown satisfactorily to generate a monodomain.

Alternatively, the polymerizable liquid crystal composition could also be applied to the substrate, and heating then conducted with the temperature held for a predetermined period at a level within the temperature range that generates a nematic phase within the polymerizable liquid crystal composition of the present invention.

If the heating temperature is too high, then the polymerizable liquid crystal compound may undergo an undesirable polymerization reaction, causing degradation of the compound. Furthermore, if the composition is cooled too far, then the polymerizable liquid crystal composition may undergo phase separation, causing crystal precipitation or the generation of a higher order liquid crystalline phase such as a smectic phase, making alignment treatment impossible.

By conducting the above type of heat treatment, an optically anisotropic medium with minimal defects and more uniform quality than that obtainable by a simple coating method can be prepared.

Furthermore, following completion of the above type of uniform alignment treatment, the composition is cooled to the lowest temperature possible without causing the liquid crystalline phase to undergo phase separation, namely, a super-cooled state, and by conducting polymerization with the liquid crystalline phase aligned at this temperature, an optically anisotropic medium with a high orientation order and superior transparency can be obtained.

(Polymerization Method) Examples of suitable methods of polymerizing a polymerizable liquid crystal composition of the present invention include methods involving irradiation with an activated energy beam, and heat polymerization methods, although methods involving irradiation with an activated energy beam are preferred as they require no heating and enable the reaction to proceed at room temperature, and of such methods, those that utilize irradiation with light such as ultraviolet light are particularly preferred for their ease of operation. The temperature during irradiation is set to a temperature that enables the liquid crystalline phase of the polymerizable liquid crystal composition of the present invention to be maintained, and in order to avoid inducing heat polymerization of the polymerizable liquid crystal composition, the temperature is preferably set to a value no higher than 30° C. where possible. Under increasing temperature conditions, a liquid crystal composition generally exhibits a liquid crystalline phase within the temperature range between the transition temperature from C (solid phase) to N (nematic phase) (hereafter abbreviated as the C-N transition temperature), and the N-I transition temperature. On the other hand, under falling temperature conditions, because a thermodynamically nonequilibrated state is adopted, the composition may retain the liquid crystal state and not solidify even at temperatures below the C-N transition temperature. This state is referred to as a super-cooled state. In the present invention, liquid crystal compositions in a super-cooled state are included in the description of compositions in a state that exhibits a liquid crystalline phase. The intensity of the ultraviolet light irradiation is preferably within a range from $1$ $W/m^2$ to $10$ $kW/m^2$. Intensities from $5$ $W/m^2$ to $2$ $kW/m^2$ are particularly desirable. If the intensity of the ultraviolet light is less than $1$ $W/m^2$, then considerable time is needed to complete the polymerization. In contrast, if the intensity exceeds $10$ $kW/m^2$, then problems may arise, including a tendency for the liquid crystal molecules within the polymerizable liquid crystal composition to undergo photodecomposition, or the development of excessive polymerization heat, causing the polymerization temperature to rise, and thereby increasing the danger of a change in the order parameter of the polymerizable liquid crystals, and increasing the likelihood of irregularities in the retardation of the polymerized film.

By using a mask to effect polymerization by ultraviolet light irradiation only within specific portions of the composition, subsequently altering the alignment state of the unpolymerized portions by application of an electric field, magnetic field or heat, and then polymerizing these unpolymerized portions, an optically anisotropic medium having a plurality of regions with differing alignment directions can be obtained.

Furthermore, when a mask is used to effect polymerization by ultraviolet light irradiation only within specific portions of the composition, an optically anisotropic medium having a plurality of regions with differing alignment directions can also be obtained by constraining the alignment of the unpolymerized polymerizable liquid crystal composition prior to the irradiation, and then conducting the light irradiation through the mask with this constrained state maintained.

An optically anisotropic medium obtained by polymerizing a polymerizable liquid crystal composition of the present invention may be either peeled off the substrate and used as a stand-alone optically anisotropic medium, or may be used as an optically anisotropic medium as is, without removal from the substrate. Because the optically anisotropic medium is unlikely to contaminate other members, it can be favorably used as a substrate for lamination, or may also be bonded to other substrates.

EXAMPLES

As follows is a more detailed description of the present invention using a series of examples, although the present invention is in no way limited by these examples. Furthermore, in the descriptions of the composition of the following examples and comparative examples, the units "%" refer to "% by weight". Furthermore, the Mw values of the acrylic copolymers (H-1) to (H-22) were measured by polystyrene-referenced GPC. Furthermore, the quantities (molar fractions) of the group (h) and the fluoroalkyl group were determined by NMR.

(Synthesis of Acrylic Copolymers H)

Synthesis Example 1

Synthesis of a Monoacrylate A-1 Containing a Group (h)

17 g of 4-phenylphenol (0.1 mol) was dissolved in 120 mL of N,N-dimethylformamide (hereafter abbreviated as DMF), 15.2 g of potassium carbonate powder (0.11 mol) was added with constant stirring, and the mixture was then stirred for one hour while heating at 90° C. Subsequently, 6-chloro-1-hexanol (14.3 g, 0.11 mol) was added dropwise to the mixture, and the reaction was allowed to proceed for 12 hours under constant stirring. Following confirmation by gas chromatography that the peaks derived from the raw materials had disappeared, the reaction mixture was diluted with water, and the precipitated solid was recovered by filtration. The resulting solid was then recrystallized from ethanol, yielding 23 g of 4-(6-hydroxyhexyloxy)phenylbenzene (yield: 85%).

21 g (78 mmol) of the synthesized 4-(6-hydroxyhexyloxy) phenylbenzene was dissolved in 300 mL of dichloromethane. With the solution in the flask under an atmosphere of nitrogen, the flask was cooled by immersion in an ice bath, and 7.7 g of acryloyl chloride (86 mmol) was then added to the solution and stirred for 10 minutes. Subsequently, 8.7 g of triethylamine (86 mmol) was added, and following completion of the reaction, the reaction solution was washed by adding a saturated aqueous solution of sodium bicarbonate, and the organic layer was then washed with dilute hydrochloric acid and a saturated saline solution. Following drying of the organic layer with anhydrous magnesium sulfate, the solvent was removed. The crude product was purified by silica gel column chromatography, and then recrystallized from ethanol, yielding 19.4 g of a monoacrylate containing a group (h): 4-(6-acryloyloxyhexyloxy)phenylbenzene. Hereafter this monoacrylate is abbreviated as (A-1) (yield: 70%).

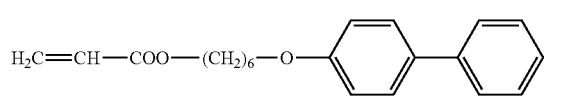

(A-1)

Synthesis Example 2

Synthesis of a Monoacrylate A-2 Containing a Group (h)

With the exception of replacing the 4-phenylphenol from the synthesis example 1 with 4-cyano-4-hydroxybiphenyl, 19.4 g of a monoacrylate containing a group (h): 1-cyano-4-(6-acryloyloxyhexyloxy)phenyl)benzene was obtained in the same manner as the synthesis example 1. Hereafter this monoacrylate is abbreviated as (A-2).

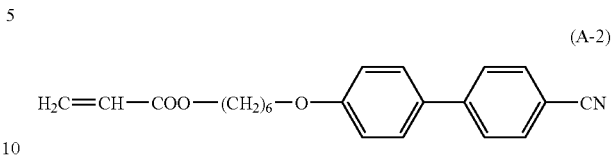

(A-2)

Synthesis Example 3

Synthesis of a Monoacrylate A-3 Containing a Group (h)

With the exception of replacing the 4-phenylphenol from the synthesis example 1 with 4-(4-pentylcyclohexyl)phenol, 19.4 g of a monoacrylate containing a group (h): 1-pentyl-4-(4-(6-acryloyloxyhexyloxy)phenyl)trans-cyclohexane was obtained in the same manner as the synthesis example 1. Hereafter this monoacrylate is abbreviated as (A-3).

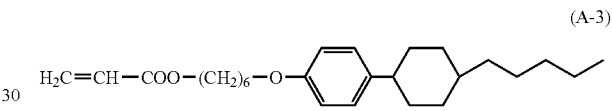

(A-3)

Synthesis Example 4

Synthesis of a Monoacrylate A-4 Containing a Group (h)

With the exceptions of replacing the 6-chloro-1-hexanol from the synthesis example 1 with 12-bromo-1-dodecanol, and using 4-(4-pentylcyclohexyl)phenol instead of the 4-phenylphenol, 25 g of a monoacrylate containing a group (h): 1-pentyl-4-(12-acryloyloxydodecyloxy)phenyl)trans-cyclohexane was obtained in the same manner as the synthesis example 1. Hereafter this monoacrylate is abbreviated as (A-4).

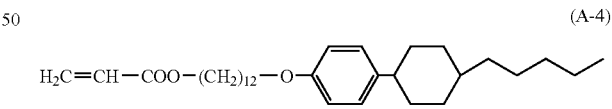

(A-4)

Synthesis Example 5

Synthesis of a Monoacrylate A-5 Containing a Group (h)

With the exception of replacing the 4-phenylphenol from the synthesis example 1 with 4-cyclohexylphenol, 15 g of a monoacrylate containing a group (h): 4-(6-acryloyloxyhexyloxy)phenyl-trans-cyclohexane was obtained in the same manner as the synthesis example 1. Hereafter this monoacrylate is abbreviated as (A-5).

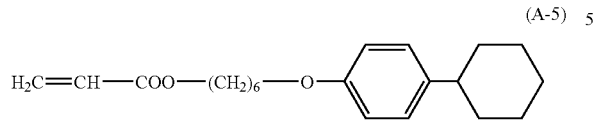

Synthesis Example 6

Synthesis of a monoacrylate A-6 containing a group (h)

With the exception of replacing the 4-phenylphenol from the synthesis example 1 with 4-(4-propylcyclohexyl)phenol, 15 g of a monoacrylate containing a group (h): 1-propyl-4-(4-(6-acryloyloxyhexyloxy)phenyl)trans-cyclohexane was obtained in the same manner as the synthesis example 1. Hereafter this monoacrylate is abbreviated as (A-6).

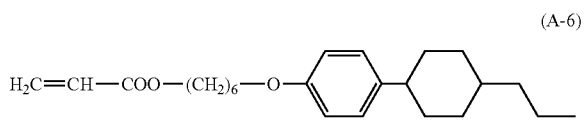

Synthesis Example 7

Synthesis of a Monoacrylate A-7 Containing a Group (h)

With the exception of replacing the 4-(6-hydroxyhexyloxy)phenylbenzene from the synthesis example 1 with 4-(4-propylcyclohexyl)phenol, 15 g of a monoacrylate containing a group (h): 4-(4-propylcyclohexyl)phenyl acrylate was obtained in the same manner as the synthesis example 1. Hereafter this monoacrylate is abbreviated as (A-7).

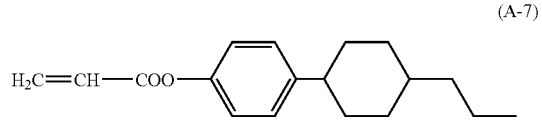

Synthesis Example 8

Synthesis of a Monoacrylate A-8 Containing a Group (h)

With the exception of replacing the 4-(6-hydroxyhexyloxy)phenylbenzene from the synthesis example 1 with 4-[(4-pentylphenyl)ethynyl]phenol, 15 g of a monoacrylate containing a group (h): 4-[(4-pentylphenyl)ethynyl]phenyl acrylate was obtained in the same manner as the synthesis example 1. Hereafter this monoacrylate is abbreviated as (A-8).

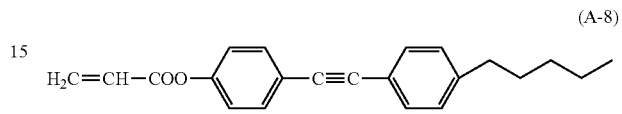

Synthesis Example H1

Synthesis of an Acrylic Copolymer (H-1)

Into a glass polymerization tube was weighed 18 g of the compound (A-1), 9.3 g of 1H,1H,2H,2H-heptadecafluorodecyl acrylate, and 0.55 g of 2,2'-azobis(2,4-dimethylvaleronitrile), and 200 mL of toluene was then added to dissolve the mixture. Oxygen was removed from the solution via a stream of nitrogen, and the solution was then reacted at 60° C. for 24 hours. Following completion of the reaction, the reaction solution was concentrated down, and the concentrated liquid was added dropwise to 1 L of methanol. The precipitated solid was washed thoroughly with methanol, yielding 15 g of an acrylic copolymer (H-1) containing 4-hexyloxybiphenyl groups and 1H,1H,2H,2H-heptadecafluorodecyl groups, with a Mw of 47,000. (Molar fraction of (4-hexyloxybiphenyl groups) (the group (h)): 77 mol%, fluorine group content: 20% by weight)

Synthesis Examples H2 to H22

Synthesis of Acrylic Copolymers (H-2) to (H-22)

Acrylic copolymers (H-2) to (H-22) were synthesized as shown below, in the same manner as the synthesis example H1. The monomers used, the blend quantities, and the molecular weights of the obtained copolymers are shown in Table 1 and Table 2.

TABLE 1

Table 1

| Synthesis example | | Monomer description and blend quantity [numbers inside ( ) represent mol %] | | | Molecular weight |
|---|---|---|---|---|---|
| H-1 | A-1 | 18 g (77) | 1H,1H,2H,2H-heptadecafluorodecyl acrylate | 9.3 g (24) | 47,000 |
| H-2 | A-1 | 26 g (90) | 1H,1H,2H,2H-heptadecafluorodecyl acrylate | 4.7 g (10) | 50,000 |
| H-3 | A-1 | 21 g (65) | 1H,1H,2H,2H-heptadecafluorodecyl acrylate | 18 g (35) | 42,000 |

TABLE 1-continued

Table 1

| Synthesis example | | Monomer description and blend quantity [numbers inside ( ) represent mol %] | | | | | Molecular weight |
|---|---|---|---|---|---|---|---|
| H-4 | A-1 | 6.12 g (95) | 1H,1H,2H,2H-heptadecafluorodecyl acrylate | 0.53 g (5) | | | 55,000 |
| H-5 | A-1 | 0.2054 g (9) | 1H,1H,2H,2H-heptadecafluorodecyl acrylate | 0.2026 g (6) | Methyl methacrylate | 0.6021 g (85) | 22,900 |
| H-6 | A-1 | 2.85 g (87) | 1H,1H,2H,2H-heptadecafluorodecyl acrylate | 0.66 g (13) | | | 81,000 |
| H-7 | A-1 | 2.66 g (79) | 1H,1H,2H,2H-heptadecafluorodecyl acrylate | 1.15 g (21) | | | 12,000 |
| H-8 | A-1 | 4.21 g (79) | 1H,1H,2H,2H-heptadecafluorodecyl acrylate | 1.82 g (21) | | | 96,000 |
| H-9 | A-1 | 15.42 g (79) | 1H,1H,2H,2H-heptadecafluorodecyl acrylate | 6.62 g (21) | | | 41,000 |
| H-10 | A-2 | 18 g (74) | 1H,1H,2H,2H-heptadecafluorodecyl acrylate | 9.3 g (26) | | | 39,000 |
| H-11 | A-2 | 24 g (85) | 1H,1H,2H,2H-heptadecafluorodecyl acrylate | 6.2 g (15) | | | 41,000 |

TABLE 2

Table 2

| Synthesis example | | Monomer description and blend quantity [numbers inside ( ) represent mol %] | | | | Molecular weight |
|---|---|---|---|---|---|---|
| H-12 | A-2 | 18 g (69) | 1H,1H,2H,2H-heptadecafluorodecyl acrylate | 12 g (31) | | 36,000 |
| H-13 | A-3 | 18 g (72) | 1H,1H,2H,2H-heptadecafluorodecyl acrylate | 9.3 g (28) | | 69,000 |
| H-14 | A-3 | 26 g (88) | 1H,1H,2H,2H-heptadecafluorodecyl acrylate | 4.6 g (12) | | 70,000 |
| H-15 | A-3 | 17 g (63) | 1H,1H,2H,2H-heptadecafluorodecyl acrylate | 13 g (37) | | 66,000 |
| H-16 | A-4 | 18 g (67) | 1H,1H,2H,2H-heptadecafluorodecyl acrylate | 9.3 g (33) | | 65,000 |
| H-17 | A-4 | 24 g (80) | 1H,1H,2H,2H-heptadecafluorodecyl acrylate | 6.2 g (20) | | 71,000 |
| H-18 | A-4 | 17 g (58) | 1H,1H,2H,2H-heptadecafluorodecyl acrylate | 13 g (42) | | 64,000 |
| H-19 | A-5 | 0.80 g (86) | 1H,1H,2H,2H-heptadecafluorodecyl acrylate | 0.2058 g (14) | | 25,400 |
| H-20 | A-6 | 1.24 g (80) | 1H,1H,2H,2H-heptadecafluorodecyl acrylate | 0.44 g (20) | | 39,900 |
| H-21 | A-7 | 0.83 g (70) | 1H,1H,2H,2H-heptadecafluorodecyl acrylate | 0.67 g (30) | | 37,400 |
| H-22 | A-8 | 0.88 g (70) | 1H,1H,2H,2H-heptadecafluorodecyl acrylate | 0.62 g (30) | | 13,000 |

Comparative Synthesis Examples

Synthesis of Acrylic Copolymers (H-23) to (H-26)

Comparative acrylic copolymers (H-23) to (H-26) were prepared in the same manner as the synthesis example H-1. The monomers used, the blend quantities, and the molecular weights of the obtained copolymers are shown in Table 3. Furthermore, the acrylic copolymer (H-7) was fractionated by GPC, yielding a comparative acrylic copolymer (H-26) with a molecular weight of 7,000.

TABLE 3

| Synthesis example | Monomer description and blend quantity | | | | Molecular weight |
|---|---|---|---|---|---|
| H-23 | Methyl methacrylate | 1.013 g | | | 29,600 |
| H-24 | A-1 | 1.0365 g | | | 32,000 |

(Preparation of Polymerizable Liquid Crystal Compositions LC-1 and LC-2)

Using compounds represented by formulas (a) through (e) shown below, polymerizable liquid crystal compositions LC-1 and LC-2 were prepared.

LC-1: The blend ratio (a):(b):(c):(d):(e), reported as a weight ratio, was 33:22:22:18:5.

LC-2: The blend ratio (c):(d), reported as a weight ratio, was 50:50.

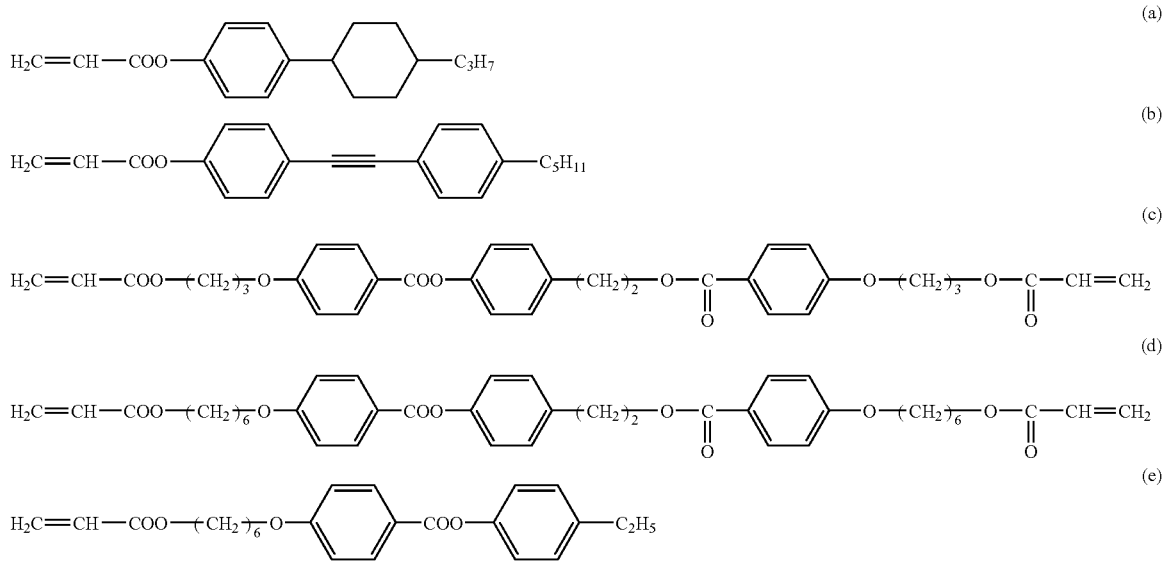

TABLE 3-continued

| Synthesis example | Monomer description and blend quantity | | | | Molecular weight |
|---|---|---|---|---|---|
| H-25 | A-1 | 16 g (50) | 1H,1H,2H,2H-heptadecafluorodecyl acrylate | 26 g (50) | 60,000 |
| H-26 | A-1 | 18 g (77) | 1H,1H,2H,2H-heptadecafluorodecyl acrylate | 9.3 g (24) | 7,000 |

(Comparative Additives)

A fluorine-based compound with a structure represented by a formula M shown below was used as a comparative additive. (The fluorine group content within the additive (M) is 50% by weight, the group (h) content is 35% by weight, and the molecular weight is 644.)

(Preparation of Substrates for Optically Anisotropic Media)

0.5 g of an azo compound represented by a formula (S) shown below was dissolved with heating in 25 g of N-methylpyrrolidone, and 25 g of butyl cellosolve (2-butoxyethanol) was then added to the solution. The resulting solution was then filtered through a polyvinylidene fluoride membrane filter with a pore diameter of 0.45 μm. This solution of the azo compound (S) was then spin coated (for 5 seconds at 500 rpm, and then 25 seconds at 2,500 rpm) onto a glass plate formed from optical glass with a thickness of 1 mm and dimensions of 100 mm×100 mm that had been subjected to ultrasonic cleaning, and the glass plate was then dried for 1 minute on a 100° C. hotplate.

Using each of the methods 1 through 3 described below, optically anisotropic medium substrates that included an orientation film were prepared.

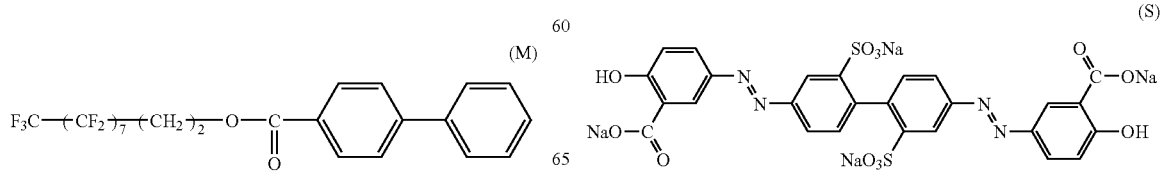

(Method 1)

The optical glass plate was irradiated with ultraviolet light of 366 nm at room temperature and with a tilt angle of 45° (ultraviolet light intensity: 50 mW/cm$^2$, irradiation time: 100 seconds).

(Method 2)

The optical glass substrate was irradiated with polarized ultraviolet light of 366 nm from directly above the substrate (ultraviolet light intensity: 20 mW/cm$^2$, irradiation time: 100 seconds).

(Method 3)

A polyimide alignment film (AL-1254, manufactured by JSR Corporation) was formed on the glass of the optical glass substrate, and the polyimide film was then subjected to rubbing treatment to complete preparation of the substrate.

(Preparation of Optically Anisotropic Media)

Optically anisotropic media were prepared by using the method 4 or 5 described below to apply a composition, prepared in one of the examples or comparative examples described below by adding an acrylic copolymer H to a polymerizable liquid crystal composition, to an optically anisotropic medium substrate containing an alignment film prepared by one of the methods described above.

(Method 4)

Using a cap coater 3 (a coating device manufactured by Hirano Tecseed Co., Ltd.), the composition was applied to the optically anisotropic medium substrate containing an alignment film. The direction of coating was set to the same direction as the alignment restraining force of the alignment film. The coating temperature was 25° C. Following application, the composition was allowed to stand in the air for 10 minutes at 50° C. to evaporate the solvent, and was then held at 25° C. for a further 5 minutes, thus yielding an aligned liquid crystal layer.

(Method 5)

Using a spin coater, the composition was applied to the optically anisotropic medium substrate containing an alignment film, and was then allowed to stand in the air for 1 minute at 50° C. and then a further 10 minutes at 80° C. to evaporate the solvent, and was then held at 25° C. for a further 5 minutes, thus yielding an aligned liquid crystal layer.

Confirmation of the alignment was performed by sandwiching the substrate between mutually orthogonal polarizing plates, and then examining the composition with a polarized light microscope. The structure was then held in a nitrogen atmosphere for 5 minutes, and then irradiated with ultraviolet light under a nitrogen atmosphere (ultraviolet light intensity: 10 W/m$^2$, irradiation time: 250 seconds), thus forming an optically anisotropic medium. The film thickness of the optically anisotropic medium was approximately 2.0 μm.

(Evaluation of Alignment Properties)

The alignment properties were evaluated by determining the presence or absence of defects, and by measuring the retardation value.

(Alignment)

The presence of defects was determined by visually inspecting the optically anisotropic medium for clouding, and by sandwiching the optically anisotropic medium between mutually orthogonal polarizing plates, and inspecting the medium for disclination lines and alignment distortion using a polarized light microscope. Optically anisotropic media which were substantially transparent, and for which no disclination lines were visible were evaluated as "excellent", optically anisotropic media which were substantially transparent, and for which a few disclination lines were visible were evaluated as "good", and optically anisotropic media which appeared cloudy, contained numerous disclination lines, and could not be claimed to provide favorable alignment were evaluated as "poor".

A state of no observed defects refers to a state in which defects represent no more than approximately 5% of the entire surface of the optically anisotropic medium.

(Retardation Value)

The retardation was measured using a liquid crystal evaluation device (OMS-DI4RD) manufactured by Chuo Precision Industrial Co., Ltd. A larger retardation value indicates an optically anisotropic medium with a larger optical anisotropy (when viewed from perpendicularly to the surface of the medium).

(Method of Measuring Liquid-Liquid Crystal Transition Temperature when 20% of an Acrylic Copolymer H is Added to a Polymerizable Liquid Crystal Composition)

20% by weight of an acrylic copolymer H synthesized using the method described above was added to either of the polymerizable liquid crystal compositions LC-1 or LC-2, and the liquid-liquid crystal transition temperature was measured. Measurement was conducted using a DSC822e device manufactured by Mettler-Toledo International Inc., by heating the sample until it reached a liquid state, and then cooling the sample at a rate of 10° C./minute.

Example 1

A coating composition was prepared by mixing together 0.5 parts of the acrylic copolymer (H-1) (the fluorine group content derived from the acrylic copolymer (H-1) relative to 100 g of the polymerizable liquid crystal composition LC-1 was 0.135 parts by weight, and the group (h) content was 0.167% by weight), 96 parts of the polymerizable liquid crystal composition LC-1, 4 parts of a photopolymerization initiator "Irgacure 907", manufactured by Ciba Specialty Chemicals Inc., and 100 parts of xylene. Using this coating composition and a substrate prepared using the above method 1, an optically anisotropic medium was prepared in accordance with the method 4, and the alignment properties were evaluated. The fluorine group content (% by weight) within the acrylic copolymer (H-1), the ratio (mol%) within the acrylic copolymer (H-1) of side chains containing the group (h) relative to the combined total of all side chains, the nature of the polymerizable liquid crystal used, the methods used for preparing the optically anisotropic medium substrate and the optically anisotropic medium, and the evaluation results are all shown in Table 3.

The results revealed that the alignment properties were excellent, with no defects observed. Furthermore, the retardation value was a considerably large 175 nm, indicating an optically anisotropic medium with a large optical anisotropy.

Furthermore, the liquid-liquid crystal transition temperature fell 0.5° C. when 20% of the acrylic copolymer (H-1) was added to the composition LC-1. This result also confirms that use of the acrylic copolymer (H-1) enables an optically anisotropic medium with a large optical anisotropy to be obtained.

Examples 2 to 25

The acrylic copolymer (H-1) was replaced with the acrylic copolymers (H-2) through (H-22) respectively, and using the polymerizable liquid crystal composition LC-1 or LC-2 as indicated in the following table, an optically anisotropic medium was prepared using the preparation method shown in the table, and subsequently evaluated for alignment properties. The quantity added of the acrylic copolymer (H-2) through (H-22), the fluorine group content (% by weight) within the acrylic copolymer H, the ratio (mol%) within the acrylic copolymer (H) of side chains containing the group (h) relative to the combined total of all side chains, the nature of the polymerizable liquid crystal used, the methods used for preparing the optically anisotropic medium substrate and the optically anisotropic medium, and the evaluation results are all shown in Tables 4 and 5.

A-5 containing a phenylcyclohexyl group as a raw material, the retardation values and the change in the liquid-liquid crystal transition temperature were measured. The results showed that for each of the examples 1, 5, 8, and 22, the transition temperature decreased regardless of the liquid crystal composition that was used. Furthermore, the retardation values for the examples 1, 5, 8, and 22 were all at least double digit values, confirming that the optically anisotropic media had large optical anisotropy values. Particularly in the example 1 and the example 8, both of which exhibited a large biphenyl group mol%, the retardation values were very large

TABLE 4

Table 4

| Example | Additive | Fluorine group content within acrylic copolymer H (% by weight) | Ratio of groups (h) within acrylic copolymer H (mol %) | Polymerizable liquid crystal | Quantity of additive per 100 parts of polymerizable liquid crystal (parts) | Method of preparing substrate for optically anisotropic medium | Method of preparing optically anisotropic medium | Alignment | Retardation (nm) | Change in temperature of liquid-liquid crystal transition temperature $\Delta T$ (° C.) |
|---|---|---|---|---|---|---|---|---|---|---|
| 1 | H-1 | 20 | 77 | LC-1 | 0.5 | method 1 | method 4 | excellent | 175 | −0.5 |
| 2 | H-2 | 9 | 90 | LC-1 | 0.5 | method 1 | method 4 | excellent | | |
| 3 | H-3 | 29 | 65 | LC-1 | 0.5 | method 1 | method 4 | excellent | | |
| 4 | H-4 | 5 | 95 | LC-1 | 1 | method 2 | method 5 | excellent | | |
| 5 | H-5 | 13 | 9 | LC-2 | 1.5 | method 3 | method 5 | excellent | 80 | −0.8 |
| 6 | H-6 | 12 | 87 | LC-1 | 0.5 | method 1 | method 4 | excellent | | |
| 7 | H-7 | 19 | 79 | LC-1 | 0.5 | method 2 | method 5 | excellent | | |
| 8 | H-7 | 19 | 79 | LC-2 | 1.25 | method 3 | method 5 | excellent | 221 | −0.5 |
| 9 | H-8 | 19 | 79 | LC-1 | 0.5 | method 2 | method 5 | excellent | | |
| 10 | H-9 | 19 | 79 | LC-1 | 0.2 | method 2 | method 5 | excellent | | |
| 11 | H-9 | 19 | 79 | LC-2 | 6.0 | method 3 | method 5 | excellent | | |
| 12 | H-9 | 19 | 79 | LC-2 | 1.25 | method 2 | method 5 | excellent | | |
| 13 | H-10 | 21 | 75 | LC-1 | 0.5 | method 1 | method 4 | excellent | | |

TABLE 5

Table 5

| Example | Additive | Fluorine group content within acrylic copolymer H (% by weight) | Ratio of groups (h) within acrylic copolymer H (mol %) | Polymerizable liquid crystal | Quantity of additive per 100 parts of polymerizable liquid crystal (parts) | Method of preparing substrate for optically anisotropic medium | Method of preparing optically anisotropic medium | Alignment | Retardation (nm) | Change in temperature of liquid-liquid crystal transition temperature $\Delta T$ (° C.) |
|---|---|---|---|---|---|---|---|---|---|---|
| 14 | H-11 | 13 | 85 | LC-1 | 0.5 | method 1 | method 4 | excellent | | |
| 15 | H-12 | 24 | 70 | LC-1 | 0.5 | method 1 | method 4 | excellent | | |
| 16 | H-13 | 20 | 74 | LC-1 | 0.25 | method 1 | method 4 | excellent | | |
| 17 | H-14 | 9 | 88 | LC-1 | 0.25 | method 1 | method 4 | excellent | | |
| 18 | H-15 | 27 | 63 | LC-1 | 0.25 | method 1 | method 4 | excellent | | |
| 19 | H-16 | 23 | 70 | LC-1 | 1 | method 1 | method 4 | excellent | | |
| 20 | H-17 | 13 | 81 | LC-1 | 1 | method 1 | method 4 | excellent | | |
| 21 | H-18 | 27 | 58 | LC-1 | 1 | method 1 | method 4 | excellent | | |
| 22 | H-19 | 13 | 86 | LC-2 | 1.5 | method 3 | method 5 | excellent | 84 | −1.3 |
| 23 | H-20 | 16 | 80 | LC-1 | 3 | method 2 | method 5 | excellent | 5 | +8.4 |
| 24 | H-21 | 28 | 70 | LC-1 | 2 | method 2 | method 5 | excellent | | |
| 25 | H-22 | 26 | 70 | LC-1 | 0.5 | method 2 | method 5 | excellent | 5 | +4.7 |

These results show that in each of the examples 1 through 25 in which an acrylic copolymer H of the present invention was added, the alignment properties were excellent, and an optically anisotropic medium with no defects was obtained. For the examples 1, 5, 8, and 22, which used either one of the acrylic copolymers (H-1) through (H-9) produced using the monomer A-1 containing a biphenyl group as a raw material, or the acrylic copolymer (H-19) produced using the monomer three digit values, indicating that increasing the molar percentage of biphenyl groups is an effective technique for obtaining an optically anisotropic medium with a particularly large optical anisotropy.

On the other hand, the retardation value and variation in the liquid-liquid crystal transition temperature were also measured for the examples 23 and 25, which used the acrylic copolymers (H-20) and (H-22) produced using, as raw materials, the monomers A-6 and A-8, in which the group of the general formula (h) included an alkyl group as the group $Y_3$. These results revealed an increase in the transition temperature in both cases. Furthermore, the retardation value was a single digit value, confirming that an optically anisotropic medium with a small optical anisotropy had been obtained.

(Comparative Example 1)

With the exception of replacing the acrylic copolymer (H-1) with the acrylic copolymer (H-23), a coating composition was prepared, and an optically anisotropic medium was produced, in the same manner as the example 1. When the alignment properties were evaluated by inspection using a polarized light microscope, considerable disclination lines were observed (alignment: poor).

Comparative Example 2

With the exception of replacing the acrylic copolymer (H-1) with the acrylic copolymer (H-24), a coating composition was prepared, and an optically anisotropic medium was produced, in the same manner as the example 1. When the alignment properties were evaluated by inspection using a polarized light microscope, considerable disclination lines were observed (alignment: poor).

Comparative Example 3

With the exception of replacing the acrylic copolymer (H-1) with the acrylic copolymer (H-25) (fluorine group content: 38% by weight, side chains having a group represented by the general formula (h): 50 mol%), a coating composition was prepared, and an optically anisotropic medium was produced, in the same manner as the example 1. When the alignment properties were evaluated by inspection using a polarized light microscope, considerable disclination lines were observed (alignment: poor).

Comparative Example 4

With the exception of replacing the acrylic copolymer (H-1) with the acrylic copolymer (H-26), a coating composition was prepared, and an optically anisotropic medium was produced, in the same manner as the example 1. When the alignment properties were evaluated by inspection using a polarized light microscope, overall alignment distortion was observed (alignment: poor).

Comparative Example 5

With the exception of adding 0.21 parts of the additive M, so that the fluorine group content derived from the acrylic copolymer (H-1) relative to 100 g of the polymerizable liquid crystal composition LC-1 was the same 0.135% by weight observed in the example 1, an optically anisotropic medium was prepared in the same manner as the example 1 (in this case, the group (h) content was 0.050% by weight). When the alignment properties were evaluated by inspection using a polarized light microscope, considerable disclination lines were observed (alignment: poor).

Comparative Example 6

With the exception of adding 0.70 parts of the additive M, so that group (h) content derived from (H-1) relative to 100 g of the polymerizable liquid crystal composition LC-1 was the same 0.167% by weight observed in the example 1, an optically anisotropic medium was prepared in the same manner as the example 1 (in this case, the fluorine group content was 0.457% by weight). When the alignment properties were evaluated by inspection using a polarized light microscope, disclination lines were minimal (alignment: between good and poor), but the reduction in the retardation of the optically anisotropic medium resulting from dissolution of the additive M in the liquid crystal was marked, and the resulting product was unusable as an optically anisotropic medium.

Comparative Example 7

With the exception of not adding the acrylic copolymer (H-1), a coating composition was prepared, and an optically anisotropic medium was produced, in the same manner as the example 1. When the alignment properties were evaluated by inspection using a polarized light microscope, considerable disclination lines were observed (alignment: poor).

Comparative Example 8

With the exception of altering the quantity added of the acrylic copolymer (H-1) to 30% by weight, a coating composition was prepared, and an optically anisotropic medium was produced, in the same manner as the example 1. When the alignment properties were evaluated by inspection using a polarized light microscope, the alignment properties were poor.

Example 26

In the same manner as the example 1, 96 parts of the polymerizable liquid crystal composition LC-1, 4 parts of the photopolymerization initiator "Irgacure 907", manufactured by Ciba Specialty Chemicals Inc., and 100 parts of xylene were mixed together, and a quantity of the acrylic copolymer (H-1) within a range from 0 to 30 parts was then added to form a coating composition. The resulting series of compositions were used to prepare optically anisotropic media in accordance with the above method 4, and the quantity of defects was measured for each medium. The quantity of defects was evaluated by determining the proportion of pixels for which light leakage had occurred as a result of an alignment defect.

The optically anisotropic medium was placed under cross Nicol conditions, and photographed with a digital camera using a polarized light microscope. Using image analysis software, a histogram analysis was performed on the acquired image, and the number of pixels suffering from light leakage was counted. The quantity of defects was defined as the proportion of the number of pixels identified as suffering from light leakage. A larger proportion indicates a larger quantity of defects.

Figure 3:
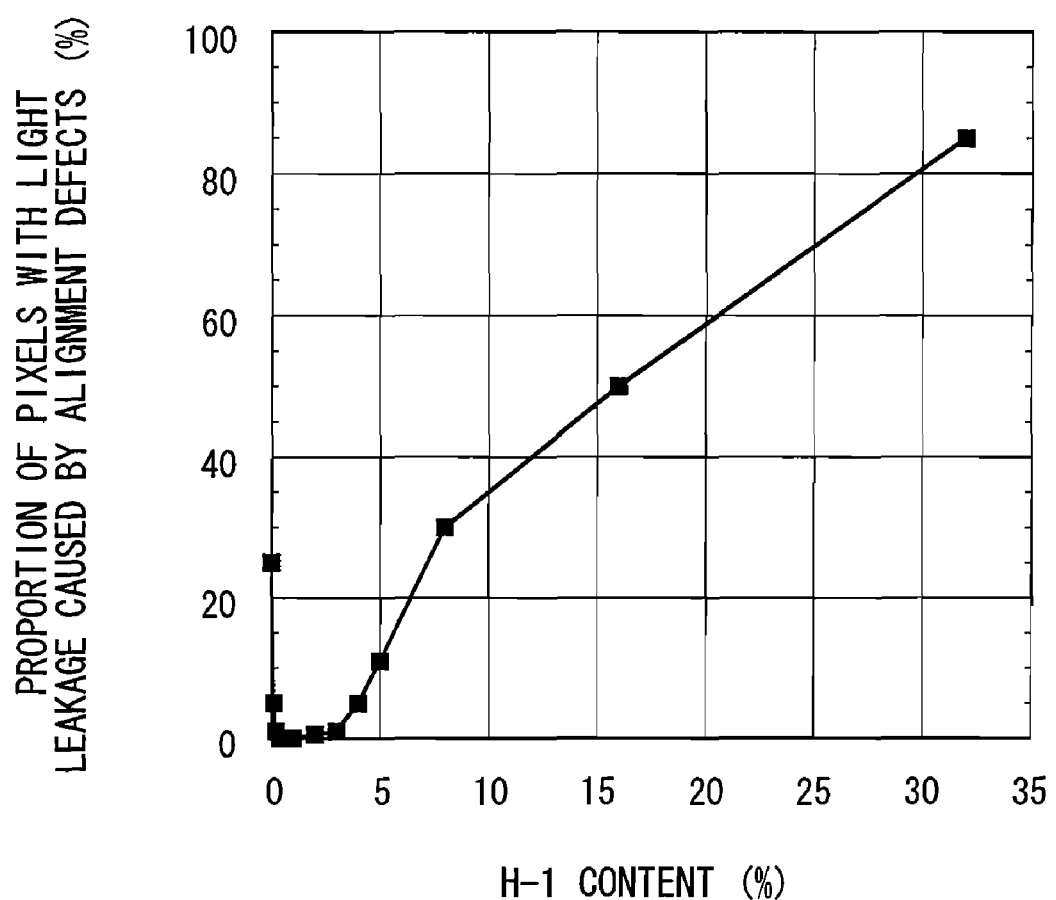
FIG. 3 is a diagram showing the relationship between the quantity added of the (meth)acrylic copolymer (H-1) and the quantity of defects in an example 1.

The results are shown in FIG. 3. These results show that the quantity of defects is no higher than 5% for addition quantities within a range from 0.1 to 4%.

(Optically Anisotropic Medium in which Regions with Different Alignment Directions are Dispersed across the Medium in a Pattern)

Example 27

During preparation of the optically anisotropic medium substrate, prior to the irradiation treatment of the above method 1, the substrate containing the azo compound layer (the alignment film) was secured to a stage with a horizontal rotation mechanism, and with the stage rotation scale fixed at +10°, irradiation with ultraviolet light of 366 nm was conducted from an tilt angle of 45° (ultraviolet light intensity: 50 mW/cm², irradiation time: 100 seconds), thus forming a substrate with a uniform alignment function.

Subsequently, the stage with the horizontal rotation mechanism to which the substrate with an alignment function was secured was rotated and fixed with the rotation scale at −10°. By subsequently conducting ultraviolet light irradiation through a photomask, under the same conditions as above, a substrate with an alignment function wherein regions of differing alignment direction are dispersed in a pattern across the substrate was obtained.

(Preparation of Optically Anisotropic Medium)

Using a cap coater 3 (a coating device manufactured by Hirano Tecseed Co., Ltd.), the liquid crystal composition containing the acrylic copolymer (H-1) prepared in the example 1 was applied to the surface of the above substrate with an alignment function in which regions of differing alignment direction were dispersed in a pattern across the substrate. The direction of coating was set to the same direction as a symmetrical line between the two alignment restraining forces of the alignment film. The coating temperature was 25° C.

Following application, the composition was allowed to stand in the air for 10 minutes at 50° C. to evaporate the solvent, and was then held at 25° C. for a further 5 minutes, thus completing alignment of the liquid crystal molecules. Confirmation of the alignment was performed by sandwiching the substrate between mutually orthogonal polarizing plates, and then examining the composition with a polarized light microscope. The structure was then held in a nitrogen atmosphere for 5 minutes, and then irradiated with ultraviolet light under a nitrogen atmosphere (ultraviolet light intensity: 10 W/m², irradiation time: 250 seconds), thus forming an optically anisotropic medium. The film thickness of the optically anisotropic medium was approximately 2.0 µm.

(Confirmation of Alignment Pattern)

The optically anisotropic medium was placed between two mutually orthogonal polarizing plates, and the optically anisotropic medium was then rotated while the in-plane brightness pattern was observed. In addition, inspection of the optically anisotropic medium under a polarized light microscope confirmed that regions of differing alignment direction were distributed across the medium, that the alignment direction differed in a pattern, and that no defects were visible.

INDUSTRIAL APPLICABILITY

An optically anisotropic medium that uses a polymerizable liquid crystal composition of the present invention has applications not only to optical compensation plates, optical low-pass filters, and polarizing prism materials, but also to all manner of retardation films, wavelength plates, polarizing plates, optical waveguides, piezoelectric elements, nonlinear optical elements, various light filters, components for lasers, pigments that utilize selective reflection for cholesteric liquid crystalline phases and the like, and coatings for optical fibers and the like.

The invention claimed is:

1. A polymerizable liquid crystal composition, comprising a liquid crystal compound having a polymerizable group, wherein said composition comprises from 0.1 to 6.0% by weight of a (meth)acrylic copolymer (H), which 1) has a side chain containing a fluorine group, and a side chain containing a group represented by a general formula (h):

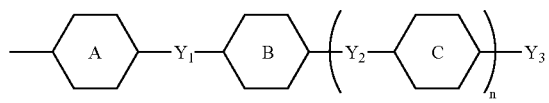

(wherein, 6-membered rings A, B, and C each represent, independently:

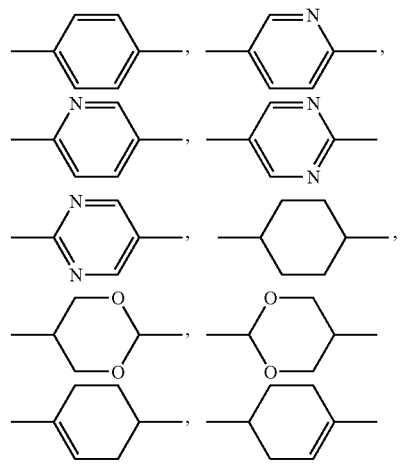

(and said 6-membered rings A, B, and C may include a fluorine atom or a methyl group), n represents an integer of either 0 or 1, $Y_1$, and $Y_2$ each represent, independently, a single bond, —$CH_2CH_2$—, —$CH_2O$—, —$OCH_2$—, —COO—, —OCO—, —C≡C—, —CH=CH—, —CF=CF—, —$(CH_2)_4$—, —$CH_2CH_2CH_2O$—, —$OCH_2CH_2CH_2$—, —$CH_2$=$CHCH_2CH_2$—, or —$CH_2CH_2CH$=$CH$—, and $Y_3$ represents a hydrogen atom, a halogen atom, a cyano group, or an alkyl group, alkoxy group, alkenyl group or alkenyloxy group of 1 to 20 carbon atoms), 2) has a fluorine group content of 3 to 30% by weight, 3) has a ratio of side chains containing said group represented by said general formula (h) relative to a combined total of all side chains that falls within a range from 9 to 95 mol %, and 4) has a weight average molecular weight within a range from 10,000 to 300,000.

2. A polymerizable liquid crystal composition according to claim 1, wherein said (meth)acrylic copolymer (H) is a (meth) acrylic copolymer produced using, as essential raw materials, a mono(meth)acrylate containing a group represented by said general formula (h), and a mono(meth)acrylate containing a fluoroalkyl group of 1 to 18 carbon atoms in which at least one hydrogen atom has been substituted with a fluorine atom.

3. A polymerizable liquid crystal composition according to claim 2, wherein said mono(meth)acrylate containing a group represented by said general formula (h) is a compound represented by a general formula (1) shown below:

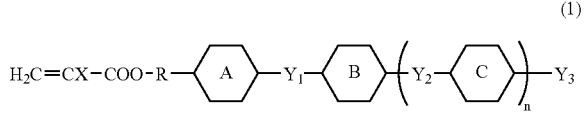

(wherein, X represents a hydrogen atom or a methyl group, R represents an alkylene group of 1 to 18 carbon atoms (although within said alkylene group, either one, or two or more methylene groups that are not bonded directly to a —COO— group may be substituted, mutually independently, with an —O— group, provided oxygen atoms are not bonded directly to each other), 6-membered ring A, 6-membered ring B, 6-membered ring C, and groups $Y_1$, $Y_2$, and $Y_3$ all represent identical groups to those defined in relation to said general formula (h), and n represents an identical integer to that defined for said general formula (h)).

4. A polymerizable liquid crystal composition according to claim 1, wherein $Y_3$ in said general formula (h) is a hydrogen atom.

5. A polymerizable liquid crystal composition according to claim 1, wherein in said general formula (h), said 6-membered rings A, B, and C are 1,4-phenylene groups or 1,4-cyclohexylene groups.

6. A polymerizable liquid crystal composition according to claim 1, wherein said general formula (h) is a biphenyl group or a phenylcyclohexyl group.

7. A polymerizable liquid crystal composition according to claim 1, wherein said (meth)acrylic copolymer (H) comprises from 9 to 95 mol % of structural units represented by a general formula (2), and from 3 to 45 mol % of structural units represented by a general formula (3):

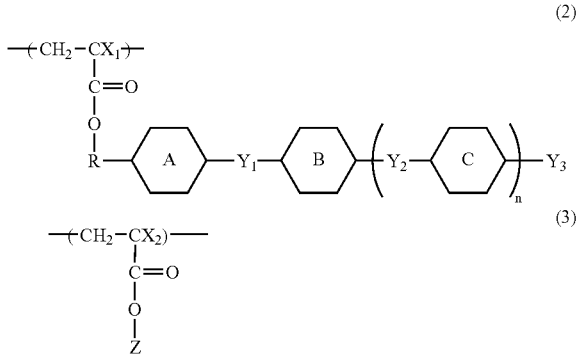

(wherein, R, 6-membered ring A, 6-membered ring B, 6-membered ring C, and groups $Y_1$, $Y_2$, and $Y_3$ all represent identical groups to those defined in relation to said general formula (1), n represents an identical integer to that defined for said general formula (1), $X_1$ and $X_2$ each represent, independently, a hydrogen atom or a methyl group, and Z represents a fluoroalkyl group of 1 to 18 carbon atoms in which at least one hydrogen atom has been substituted with a fluorine atom (although methylene groups within said group may be substituted, mutually independently, with a —$SO_2NZ_2$— or —$CONZ_2$— group, wherein $Z_2$ represents an alkyl group, and moreover, said fluoroalkyl group may also include substituent groups)).

8. A polymerizable liquid crystal composition according to claim 1, wherein said (meth)acrylic copolymer (H) comprises from 9 to 95 mol % of structural units represented by a general formula (2-1), and from 3 to 45 mol % of structural units represented by a general formula (3-1):

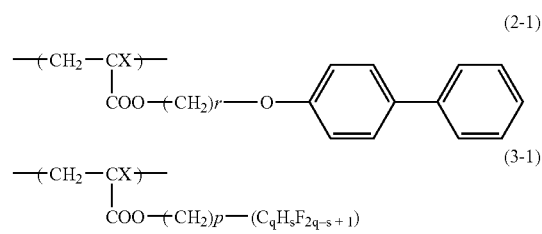

(wherein, X represents a hydrogen atom or a methyl group, r represents an integer from 1 to 18, p represents an integer from 1 to 8, q represents an integer from 1 to 13 (provided p+q is at least 2 but no greater than 17), and s represents an integer from 0 to 7).

9. A polymerizable liquid crystal composition according to claim 1, which exhibits a nematic liquid crystalline phase.

10. A polymerizable liquid crystal composition according to claim 1, wherein a mixing liquid crystal temperature reduction ΔT defined below is within a range from −10° C. to −0.1° C.:

$$\Delta T = T_h - T_0$$

(wherein, $T_h$=(a liquid-liquid crystal transition temperature when said polymerizable liquid crystal composition comprises 20% by weight of said (meth)acrylic copolymer (H)), and $T_0$=(a liquid-liquid crystal transition temperature of a composition in which said (meth)acrylic copolymer (H) is excluded from said polymerizable liquid crystal composition)).

11. An optically anisotropic medium, produced by applying a polymerizable liquid crystal composition according to claim 1 to a substrate that exhibits an alignment function, and then polymerizing said composition in an aligned state.

12. An optically anisotropic medium according to claim 11, wherein said substrate that exhibits an alignment function is a substrate that exhibits an approximately horizontal alignment function.

13. An optically anisotropic medium according to claim 11, wherein said substrate that exhibits an alignment function is a substrate with an alignment function in which regions with differing alignment directions are dispersed in a pattern.

14. An optically anisotropic medium according to claim 11, wherein said substrate that exhibits an alignment function is a substrate containing a photoalignment film.

15. A retardation film, produced by applying a polymerizable liquid crystal composition according to claim 1 to a substrate that exhibits a approximately horizontal alignment function in which regions with differing alignment directions are dispersed in a pattern, and then polymerizing said composition in an aligned state.

* * * * *